United States Patent [19]
Ohno et al.

[11] Patent Number: 5,293,034
[45] Date of Patent: Mar. 8, 1994

[54] FOCUS STATE DETECTION DEVICE

[75] Inventors: Yoshimi Ohno, Kawasaki; Junichi Shinohara; Ikuya Tsurukawa, both of Yokohama, all of Japan

[73] Assignee: Ricoh Company, Ltd., Tokyo, Japan

[21] Appl. No.: 709,972

[22] Filed: Jun. 4, 1991

[30] Foreign Application Priority Data

| | | | |
|---|---|---|---|
| Jun. 5, 1990 | [JP] | Japan | 2-145290 |
| Jul. 6, 1990 | [JP] | Japan | 2-179362 |
| Jul. 20, 1990 | [JP] | Japan | 2-190738 |
| Sep. 4, 1990 | [JP] | Japan | 2-232368 |
| Sep. 12, 1990 | [JP] | Japan | 2-240108 |
| Apr. 18, 1991 | [JP] | Japan | 3-115322 |

[51] Int. Cl.$^5$ ............................................. G01J 1/20
[52] U.S. Cl. ................................................ 250/201.8
[58] Field of Search ................. 250/201.8, 201, 204, 250/201.4

[56] References Cited

U.S. PATENT DOCUMENTS 4,988,856  1/1991  Hamada et al. .................. 200/201.8

FOREIGN PATENT DOCUMENTS 60-33522  2/1985  Japan .
62-192732  3/1987  Japan .
62-125311  6/1987  Japan .

*Primary Examiner*—Vincent P. McGraw
*Assistant Examiner*—K. P. Hantis
*Attorney, Agent, or Firm*—Oblon, Spivak, McClelland, Maier & Neustadt

[57] ABSTRACT

A focus state detection device comprising: a first optical conversional system for forming an optical flux in one of two symmetric regions with respect to an optical axis of an optical flux from a subject to be photographed; a second optical conversional system for forming an optical flux in the other of the two symmetric regions; and a third optical conversional system for forming an optical flux in a region including the optical axis. The device further comprises a first and a second photoelectric converters for generating electric signals in response to optical intensity distribution data of the fluxes formed by the first and second systems, respedtively; a third photoelectric converter for generating an electric signal in response to optical intensity distribution data of the flux formed by the third system; and a calculation unit for detecting a focus state of the subject on the basis of correlation between three electric signals output from the first, second and third converter means.

8 Claims, 19 Drawing Sheets

FOCUS STATE DETECTION DEVICE

BACKGROUND OF THE INVENTION

1. Field of the Invention

The present invention relates to a focus state detection device, more particularly, it relates to a device which is arranged to detect the focussing state of the optical beam of the subject to be photographed through the finder system which is arranged independent from the photographing lens system.

2. Description of the Related Art

There are two ways to detect the focus state of the subject image formed on the film surface. One is the TTL detection method in which a part of the beam flux is guided to a detector such as a CCD after passing through the lens, which method is often used in a single lens reflex camera. The second way is to guide the optical flux which passed a distance measurement system disposed near the finder arranged independent from the photographing lens system, which way is often used in a lens shutter camera.

The focus state detection methods adopt a phase difference detection process as described below.

First, in the distance measuring system, the optical flux from the subject is divided into two portions which are symmetric with each other with respect to the optical axis of the measurement system in the distance measuring device so that two images are formed again for respective portions of the flux. The focus state is detected from the relative position between the two images so that the defocus amount information can be obtained when the image of the subject is dislocated from the focus point and formed before or behind the focus point.

A photoelectric element such as a CCD is used for detecting the relative position of the two images in the above-mentioned focus state detection device. With the use of such a photoelectric element, it becomes possible to detect not only whether the lens is in focus or not but also measure the defocus amount at a high speed by processing the output from the element completely electrically so as to perform calculations on the basis of the output.

With regard to the focus state detection device, Japanese Patent Application Laying Open (KOKAI) No. 62-192732 discloses an electric circuit for obtaining the drive amount of the lens so as to arrange it in focus.

Also, Japanese Patent Application Laying Open (KOKAI) No. 62-125311 discloses a technique for avoiding defocus of the lens when the subject is moving at a high speed.

Further, Japanese Patent Application Laying Open (KOKAI) No. 60-33522 discloses a technique for avoiding the focus error when the luminance of the subject is suddenly changed.

However, in accordance with the focus state detection device according to the prior art, the defocus amount data has to be measured for several times in order to raise the distance measurement accuracy and anticipate the motion of the subject. In this case, every time the distance is measured, the two symmetric areas of the flux are detected by the CCD so as to obtain the phase difference between the two images in respective areas and the driving amount of the photographing lens for focosing the lens is calculated from the data of the phase difference output from the CCD. This results in an increase of time for measuring the distance and detection of the focus state. That is, the total detection time is increased to the time of detection for one detection motion multiplied by the number of the detection times.

Also, in accordance with the detection device mentioned above, the optical finder system and the distance measuring optical system are separately arranged in such a way that the three positions, i.e., the photographing plane in the optical photographing system, the viewing plane in the finder system and the distance measurement portion in the distance measuring optical system are arranged at the same position so as to avoid the parallax that is the dislocation of the photographing plane in the lens system with respect to the viewing plane in the finder according to the distance of the subject to be photographed. To avoid the parallax, the device is so arranged that a distance frame is disposed in the finder system or that the view field frame is shifted according to the distance of the subject.

However, since such an arrangement for avoiding the parallax is not applied between the finder system and the distance measuring system, it is difficult to precisely determine the portion where the distance is measured in the view field. Therefore, this results in that the photograph does not fully meet the intention of the user.

For example, the distance measuring area is usually located at the center portion of the view field plane. The viewing portion of the view field plane is changed according to the distance of the subject to avoid the parallax between the photographing plane, which results in that the parallax is generated between the finder optical system and the distance measuring optical system.

Therefore, even though the subject is positioned at the center of the view field plane and the distance thereof is measured by pressing half of the shutter button, it often occurs that the image is defocussed since the portion where the distance is actually measured is dislocated from the center of the view field plane.

Also, in accordance with the focus state detection device mentioned above, to upgrade the reliability of the focus error signal, the device is arranged in such a manner that a light receiving monitor is disposed near the focus error signal detecting unit so that the optical integration functioned by the unit is stopped when the output from the monitor reaches a predetermined value and the unit outputs the integration result therefrom.

Accordingly, the image in the light receiving portion of the focus error signal detector unit is moved according to the state of focus. Due to this motion of the unit, even when the image in the monitor is not changed during the distance measurement operation, the average output from the light receiving portion of the monitor is changed.

Also, when the subject luminance is abruptly changed during the distance measurement operation, the average output from the monitor changes beyond the actual change of the luminance.

The change of the average output results in that the stop point of the optical integration in the light receiving portion of the focus error signal detection unit is influenced from the distance of the subject.

This means that the reliability of the output from the focus error signal detection unit is lowered.

SUMMARY OF THE INVENTION

The present invention was made considering the above-mentioned problems of the related art.

It is therefore an object of the present invention to provide a focus state detection device which detects the focus state accurately without lowering the accuracy of the phase difference detection method and enables to shorten the time for detection involving a plurality of the same detection steps.

Another object of the present invention is to provide a focus state detection device in which the distance measuring area in the view field surface is not changed when the distance of the subject is changed.

Still another object of the present invention is to provide a focus state detection device in which the reliability of the focus error detection is not lowered irrespective of the luminance of the subject or when the luminance of the subject is changed according to the motion of the subject.

The above-mentioned objects of the present invention can be achieved by a focus state detection device comprising:

a first optical conversional system for forming an optical flux in one of two symmetric regions with respect to an optical axis of an optical flux from a subject to be photographed;

a second optical conversional system for forming an optical flux in the other of the two symmetric regions;

a third optical conversional system for forming an optical flux in a region including the optical axis;

a first photoelectric converter system for generating an electric signal in response to optical intensity distribution of the flux formed by the first conversional system;

a second photoelectric converter system for generating an electric signal in response to optical intensity distribution of the flux formed by the second conversional system;

a third photoelectric converter system for generating an electric signal in response to optical intensity distribution of the flux formed by the third conversional system; and a calculation circuit for detecting a focus state of the subject on the basis of correlation between three electric signals output from the first, second and third converter systems.

In accordance with the above-mentioned structure of the present invention device, with regard to the three signals, that is, a photoelectric signal of the optical intensity distribution obtained from the image of the flux in the area including the optical axis of the beam of the subject in addition to the two signals obtained from the essential arrangement of the phase difference detection method, no that the three signals are simultaneously detected in each distance detection step but that two signals are selected from the three signals in the plurality of distance measuring steps.

Therefore, it is an advantage of the present invention that the focus state is detected accurately at a high speed.

Another advantage of the present invention is that it becomes possible to avoid the parallax in the distance measuring area of the view field surface since a part of the optical flux in the finder optical system is guided to the distance measuring optical system so that the distance is measured from the flux guided from the finder system.

Also, still another advantage of the present invention is that the time for detecting the focus state is shortened since two image information data are selectively taken out in the plurality of image information reading steps from the data of the three optical receiving portions, that is, the first and second symmetric portions symmetric with respect to the optical axis of the system and the third portion including the optical axis.

Besides, the ending point of the optical integration for detecting the focus error in the first to third portions is set as the point when the output from the light receiving monitor reaches a predetermined value, which monitor is disposed in the vicinity of the third light receiving portion including the optical axis of the beam flux of the subject, which portion is not changed in the plane perpendicular to the optical axis of the beam flux from the subject even when the subject is moved along the optical axis.

Therefore, it is further advantage of the present invention that the optical integration can be accurately carried out even when the subject luminance is changed or the subject is moved along the optical axis of the light flux therefrom, which raises the reliability of the focus state detection result.

Also, in event that two signals are selectively taken from the three signals mentioned above, it becomes possible to measure the distance in such a way that firstly a first phase difference is obtained from the first and second signals, that secondly a second phase difference is obtained from the first and third signals and that thirdly a third phase difference is obtained from the second and third signals so that a plurality of distance measuring steps are conducted on the basis of the first to third phase difference data.

Therefore, it is a still further advantage of the present invention that the motion of the subject is reliably and quickly anticipated.

Further objects and advantages of the present invention will be apparent from the following description of the preferred embodiments of the invention as illustrated in the accompanying drawings.

DESCRIPTION OF THE PREFERRED EMBODIMENTS

Figure 1:
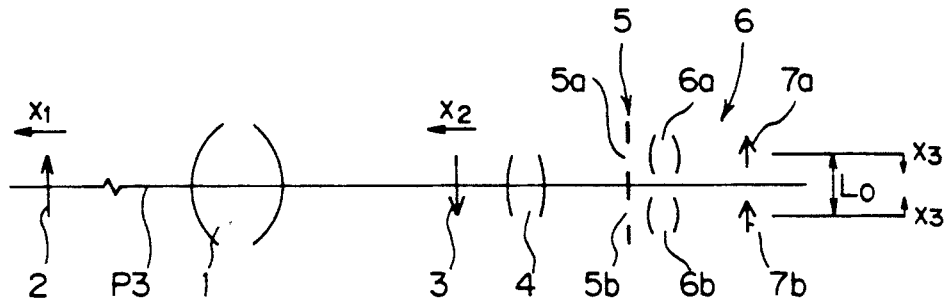
FIG. 1 is a constructional view of an example of the focus state detection device.

Embodiments of the present invention are described in detail with reference to the drawings in comparison to the related art which is also described referring to the drawings.

FIG. 1 illustrates an example of the focus state detection device.

A distance measuring optical system 1 is arranged in the vicinity of an optical finder system which is arranged independent from a photographing lens system. A subject 2 is positioned ahead of the optical system 1. An image 3 of the subject 2 is formed on a film equivalent plane by the system 1. A condenser lens 4 is disposed behind the image 3 to reimage the image 3 at a position behind the lens 4.

An example of the optical system for forming the reimage of the image 3 is constructed as follows.

On the optical axis P3 of the system 1 is disposed a mask 5 which has apertures 5a and 5b symmetric with each other with respect to the axis P3. A reimaging unit 6 composed of a pair of reimaging lenses 6a and 6b is disposed behind the mask 5. Each of the lenses 6a and 6b reimages the optical flux which passes through each of the apertures 5a and 5b.

The lenses 6a and 6b converge the fluxes which passed through the apertures 5a and 5b of the mask 5, respectively, and form images 7a and 7b from the fluxes 5a and 5b, respectively.

When the subject 2 moves by the length $X_1$ leftward in FIG. 1, the image 3 moves by the length $X_2$ leftward.

The in-focus state is the state wherein the image 3 of the subject 2 is formed on the film equivalent plane and wherein the first and second images 7a and 7b are formed on the light receiving plane constituted from the CCD with a predetermined phase difference of $L_0$ formed therebetween by the reimaging optical system comprising the lens 4, the mask 5 and the unit 6.

Also, when the image 3 on the film equivalent plane moves leftward, the images 7a and 7b approach each other by the same length of $X_3$.

In order to arrange the structure to be in focus from the state illustrated, it is necessary to shift the focus drive lens of the photographing lens unit (not shown) by the length of $X_4$ (not shown) toward the long distance side.

Also, in order to achieve an auto focus operation, the device is operated in such a way that the length $L_0$ between the images 7a and 7b is detected and the length $X_3$ is measured and that the direction of the focus drive and the drive amount $X_4$ are calculated on the basis of the length $X_3$ so that the focusing lens is driven by the amount $X_4$.

The drive amount $X_4$ to drive the photographing lens so as to set the lens to be in focus can be obtained, for instance, from the following electric circuit.

The electric circuit is constituted in such a way that two symmetric areas with respect to the optical axis of the flux from the subject are converged on the photoelectric converter unit wherein minute converter elements are disposed in a form of arrays to form an image of the subject thereon and that the analogue output data from each pixel element of the converter unit is transmitted in a parallel form to an analogue type shift register under the control of the electric charge transmission unit, and after that the shift register is driven under the control of the shifting unit to obtain the analogue output data of the pixels in series from the register.

After that, the output is converted to a digital data to obtain the phase difference between the two images 7a and 7b in FIG. 1 by a calculation circuit so that the drive amount $X_4$ is calculated on the basis of the phase difference data.

In the photoelectric converter unit, the electric charge transmission unit and the shifting control unit, the functional timing of each unit is controlled as follows.

First, the photoelectric converter unit is cleared under the control of a reset signal so that the electric charges start to be accumulated in each minute photoelectric converter element. When the output from the monitor disposed near the converter unit comes to a predetermined value, the electric charge accumulation is stopped. After that, a transmission signal is transmitted to the transmission unit so that the electric charge accumulation data (analogue voltage value) of each photoelectric converter element is transmitted in parallel to the shift register and the data is registered in each memory area of the shift register.

After a predetermined time passed from the generation of the reset signal mentioned above, a shift signal is transmitted from the shifting control unit so that the pixel data registered in the memory areas of the register is input in series to the calculation circuit including an A/D converter which calculates the drive amount of $X_4$.

The above-mentioned phase difference detection method enables to accurately focus the lens and detect the in-focus state at a high speed. However, the method can not properly function when the subject is moving. This is described further below.

When a subject is photographed, the focus state of the lens is detected by half pressing the shutter button before photographing. After that, the necessary focus drive amount is calculated from the detection result of the focus state. The focusing drive member of the photographing lens unit is driven by the calculated drive amount. Right after that, the shutter is released so as to expose the film.

Therefore, there is generated a slight time lag between the points of focus state detection and start of exposure. Accordingly, when the subject is moving at a high speed, the final image of the subject becomes out of focus, although there is no problem when the subject is stationary or moving very slowly.

To cope with this problem, for example a focusing device in conjunction with a subject movement anticipation unit is used as described below.

In accordance with the anticipation unit, a plurality of focus state detection operations are conducted in a short time period by half pressing the shutter button. The plurality of detection data are compared. If the data are the same, the subject is considered as being stationary. In this case, the exposure operation is started after a desired focusing operation.

On the other hand, if the plurality of data are different, the subject is considered as being moving toward or away from the camera. In this case, the velocity curve of the subject is calculated so as to anticipate the velocity at the point of starting the exposure. The focus drive motion is conducted on the basis of the velocity anticipation. Right after that, the exposure operation is conducted. Thereby, it becomes possible to expose in the in-state condition for the moving subject.

The essential structure and arrangement of the photoelectric converter unit, electric charge transmission unit, and shifting control unit are as follows.

First, two data is obtained from the shift register in series. The two data are an optical intensity distribution data for the first image 7a and an optical intensity distribution data for the second image 7b, respectively, in this particular example. After that, the converter unit is cleared under the control of the reset signal so as to accumulate electric charges in the minute converter elements.

When the output from the monitor reaches a predetermined value, the electric accumulation process is stopped and the transmission signal is transmitted to the electric charge transmission unit so that the accumulation data of the converter elements are transmitted in parallel to the shift register.

After that, the second distance measuring operation is conducted similarly by outputting the data in series from the shift register. Also, the third and fourth measuring operation are repeated in the same way.

In accordance with the above-mentioned focus state detection device, a plurality of the same focus state detection steps are repeated wherein the distribution data of the first and second images 7a and 7b are detected in each step. For example, if the focus state detection step is to be repeated three times, the first and second images 7a and 7b are measured three times, respectively.

Therefore, the time required for performing n times of the detection step is n times of the time required for measuring the distribution of the first and second images 7a and 7b. Accordingly, the total time required for performing whole of the focus state detection is the above-mentioned time for the plurality of detection steps plus a predetermined fixed time such as the calculation time and electric charge transmission time, etc.

The two optical fluxes divided by the optical system mentioned above are received by the photoelectric converter means such as a CCD which outputs an electric signal corresponding to the optical intensity distribution of the fluxes. The focus error signal is obtained from the phase difference between the two fluxes.

In that case, the optical intensity is converted to the electric value in such a way that the optical charge is integrated for a predetermined time, which is influenced by the luminance of the subject as a result of which the reliability of focus error signal is lowered.

More precisely, the phase difference between the two outputs corresponding to the two optical intensity distributions of the two fluxes is not influenced in principle from the luminous intensity of the flux (luminance of the subject). However, actually, the reliability of the phase difference data is lowered by the non-linearity of converter element, existence of the dark current and unstability of the output.

The above-mentioned disadvantage results not only from the change of the optical flux luminance but also the abrupt change of subject luminance when a plurality of measurements are conducted in a very short time.

To cope with the above-mentioned disadvantage, for example, a light receiving monitor unit for detecting an average of the subject luminance is arranged in the vicinity of the light receiving area of the photoelectric converter unit. When the output from the monitor unit comes to a predetermined value, the optical integration function for obtaining the focus error signal in the photoelectric converter element is stopped and the output is taken out therefrom.

Thereby, the focus error signal can be obtained at a substantially constant luminance of the subject (optical receiving amount).

However, in accordance with the focus state detection device mentioned above, the defocus amount data has to be measured for several times in order to raise the distance measurement accuracy and anticipate the motion of the subject. In this case, every time the distance is measured, the two symmetric areas of the flux are detected by the CCD so as to obtain the phase difference between the two images in respective areas and the driving amount of the photographing lens for focusing the lens is calculated from the data of the phase difference output from the CCD. This results in an increase of time for measuring the distance and detection of the focus state. That is, the total detection time is increased to the time of detection for one detection motion multiplied by the number of the detection times.

Also, in accordance with the detection device mentioned above, the optical finder system and the distance measuring optical system are separately arranged in such a way that the three positions, i.e., the photographing plane in the optical photographing system, the viewing plane in the finder system and the distance measurement portion in the distance measuring optical system are arranged at the same position so as to avoid the parallax that is the dislocation of the photographing plane in the lens system with respect to the viewing plane in the finder according to the distance of the subject to be photographed. To avoid the parallax, the device is so arranged that a distance frame is disposed in the finder system or that the view field frame is shifted according to the distance of the subject.

However, since such an arrangement for avoiding the parallax is not applied between the finder system and the distance measuring system, it is difficult to precisely determine the portion where the distance is measured in the view field. Therefore, this results in that the photograph does not fully meet the intention of the user.

For example, the distance measuring area is usually located at the center portion of the view field plane. The viewing portion of the view field plane is changed according to the distance of the subject to avoid the parallax between the photographing plane, which results in that the parallax is generated between the finder optical system and the distance measuring optical system.

Therefore, even though the subject is positioned at the center of the view field plane and the distance thereof is measured by pressing half of the shutter button, it often occurs that the image is defocussed since the portion where the distance is actually measured is dislocated from the center of the view field plane.

Also, in accordance with the focus state detection device mentioned above, to upgrade the reliability of the focus error signal, the device is arranged in such a manner that a light receiving monitor is disposed near the focus error signal detecting unit so that the optical integration functioned by the unit is stopped when the output from the monitor reaches a predetermined value and the unit outputs the integration result therefrom.

Accordingly, the image in the light receiving portion of the focus error signal detector unit is moved according to the state of focus. Due to this motion of the unit, even when the image in the monitor is not changed during the distance measurement operation, the avarage output from the light receiving portion of the monitor is changed.

Also, when the subject luminance is abruptly changed during the distance measurement operation, the average output from the monitor changes beyond the actual change of the luminance.

The change of the average output results in that the stop point of the optical integration in the light receiving portion of the focus error signal detection unit is influenced from the distance of the subject.

This means that the reliability of the output from the focus error signal detection unit is lowered.

The above-mentioned problems can be obviated by the embodiments of the present invention described below.

Figure 2:
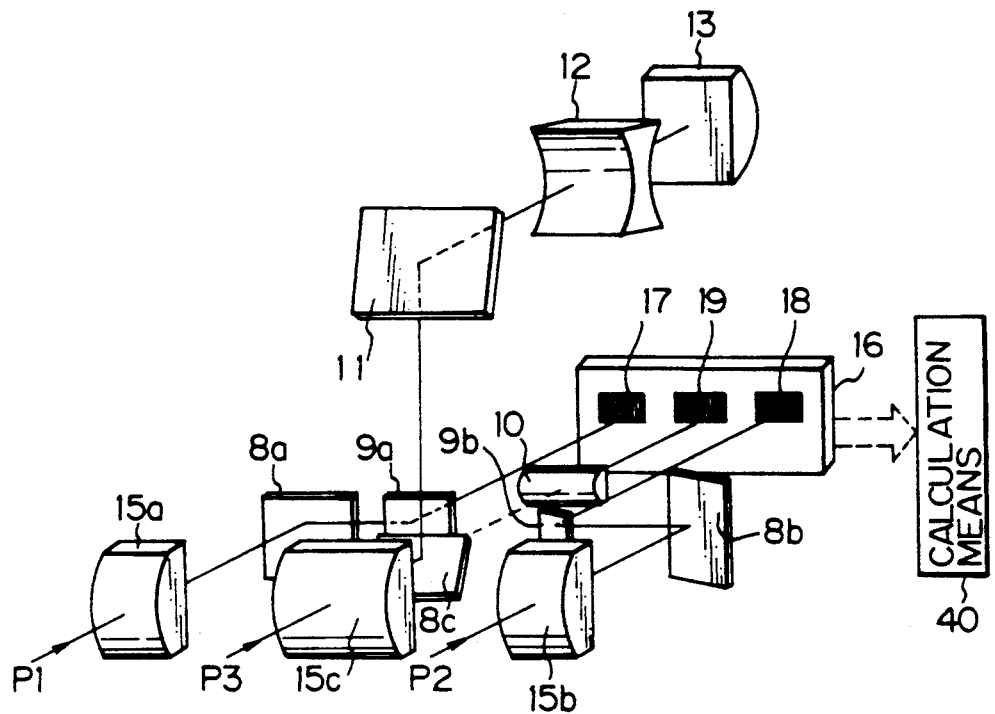
FIG. 2 is a perspective view of an embodiment of the focus state detection device in accordance with the present invention.

FIG. 2 illustrates an essential structure of an embodiment of the present invention.

A photoelectric converter unit 16 is disposed at a position which is equivalent to the position of the film surface (not shown) of the camera. In front of the unit 16, three optical conversional systems are arranged.

Figure 3:
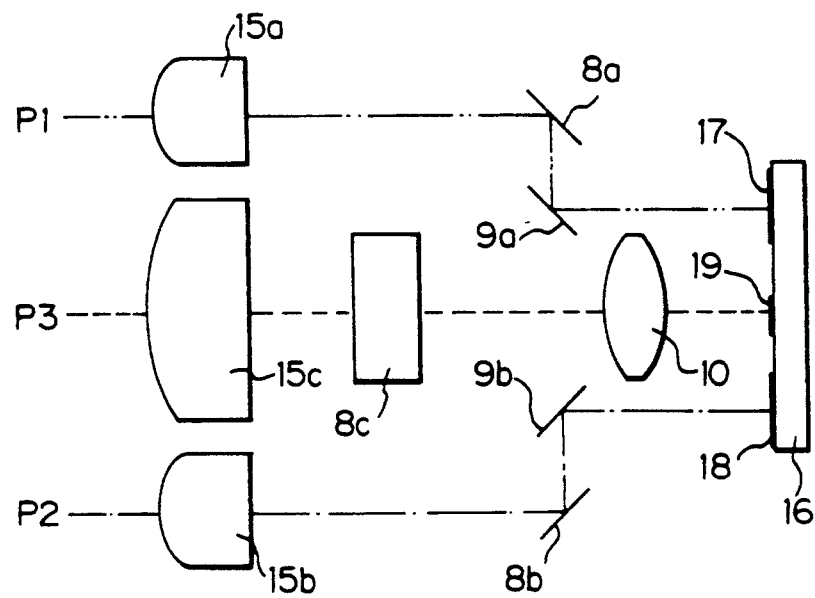
FIG. 3 is a plan view of the optical structure of the device of FIG. 2.
Figure 4:
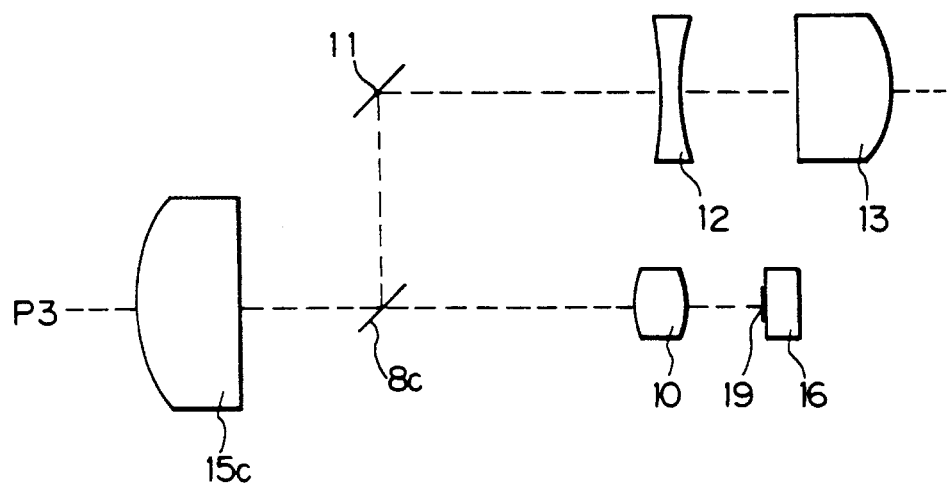
FIG. 4 is side view of the optical structure of the device of FIG. 2.
Figure 5:
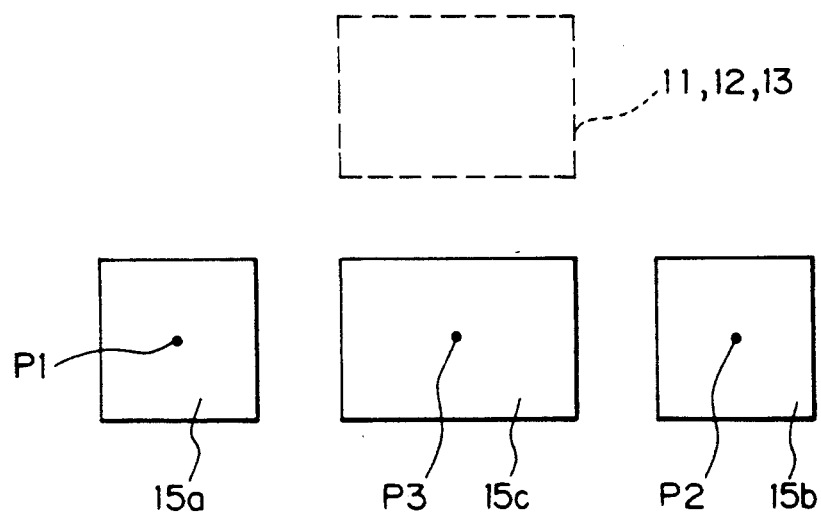
FIG. 5 is a front view of the optical structure of the device of FIG. 2.

As shown in FIGS. 3 and 4, a first optical conversional system forms an optical flux P1 and a second optical conversional system forms an optical flux P2. The two fluxes P1 and P2 are symmetric with each other with respect to an optical axis P3 of the flux of the subject in the finder optical system which is arranged to correspond to the photographing plane.

The first conversional system is constituted from a light receiving lens 15a, a mirror 8a disposed behind the lens 15a and inclined by 45 degrees with respect to the flux P1, and a mirror 9a which is inclined by 45 degrees with respect to the flux deflected by the mirror 8a. The optical flux deflected by the mirror 9a is converged on a first photoelectric converter portion 17 formed on the unit 16.

Similarly, the second conversional system is constituted from a light receiving lens 15b, a mirror 8b and another mirror 9b. The optical flux deflected by the mirror 9b is converged on a second photoelectric converter portion 18 formed on the unit 16.

Further, a third optical conversional system is arranged to form an optical flux including the optical axis P3 of the subject flux. The third conversional system is constituted from a finder lens 15c, a half-mirror 8c disposed behind the lens 15c and inclined by 45 degrees with respect to the optical path, and an optical path length correction lens 10. The optical flux which passes through the lens 10 is converged on a third photoelectric converter portion 19 formed on the unit 16.

Also, above the half-mirror 8c is arranged a finder optical system for forming a finder view field comprising a mirror 11, finder lenses 12 and 13. The optical flux for the finder view field passes through the lens 15c, the half-mirror 8c, the mirror 11 and the lenses 12 and 13 to form the finder view image.

Figure 6:
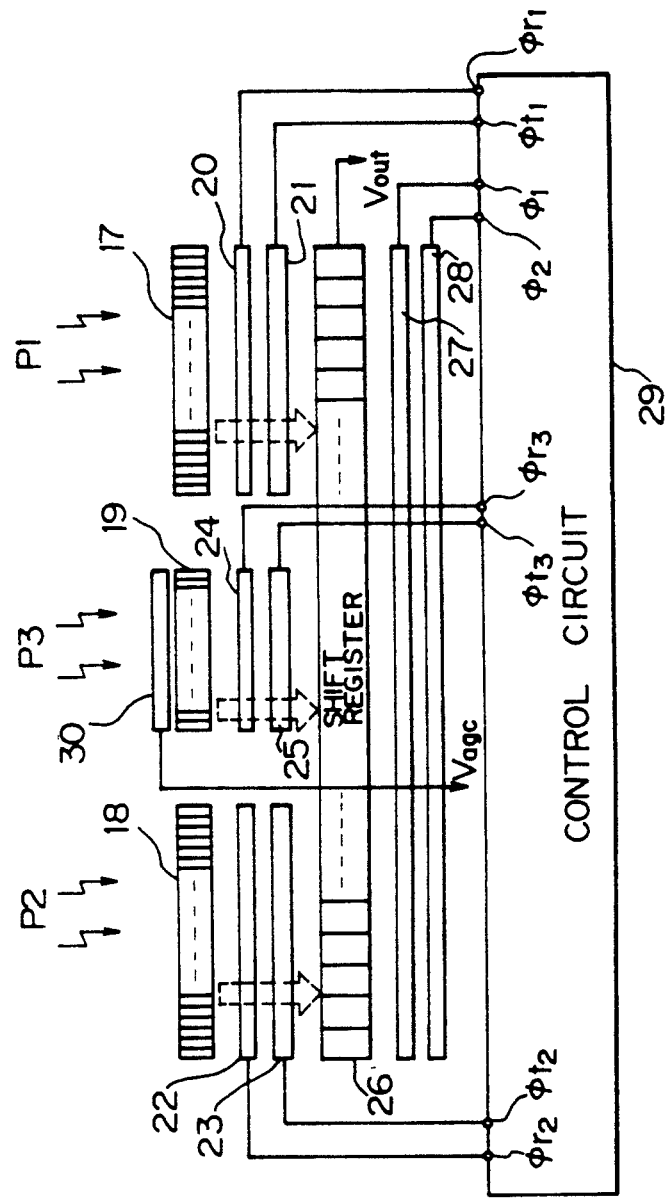
FIG. 6 is a circuit diagram of the photoelectric converter used in the device of FIG. 2.
Figure 7:
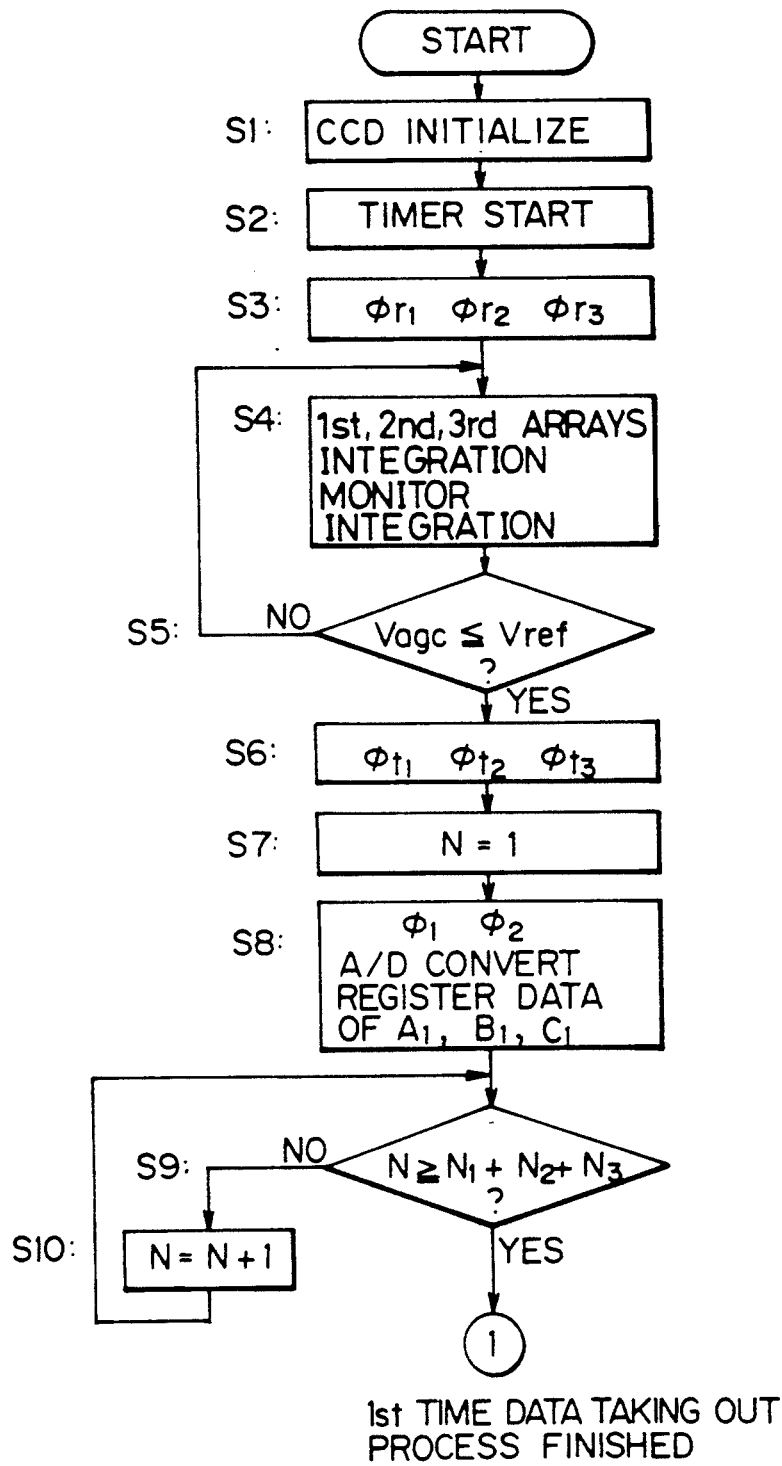
FIG. 7 is a flow chart of function in accordance with an embodiment of the present invention.

The output from the converter unit 16 is transmitted to a calculation means 40. The unit 16 comprises an electric circuit, as illustrated in FIG. 6, which is constituted from the first to third converter portions 17 to 19. Each of the converter portions 17 to 19 comprises a CCD converter device composed of minute electric charge accumulation type photoelectric converter elements disposed in arrays.

The first converter portion 17 comprises a first reset circuit 20 for clearing the electric charges accumulated in the converter element arrays and a first shifting circuit 21 for transferring the electric charges connected to the circuit 20.

Similarly, the second and third converter portions 18 and 19 comprise second and third reset circuits 22 and 24 for clearing the electric charges and second and third shifting circuits 23 and 25 for transferring the electric charges.

Also, an analogue type shift register 26 is connected to the converter portions 17, 18 and 19. Also, two shift circuits 27 and 28 are connected to the register 26 to conduct a two phase shift control in the register 26.

Further, a control circuit 29 is arranged to obtain three or two image information signals at a plurality of timings from the converter portions 17, 18 and 19, respectively, as described later in detail. The control circuit 29 simultaneously or selectively generates three clear signals for the reset circuits 20, 22 and 24 (first, second, and third reset pulses $\phi r_1$, $\phi r_2$, $\phi r_3$), three transfer signals for the shifting circuit 21, 23 and 25 (first, second, and third shift pulses $\phi t_1$, $\phi t_2$, $\phi t_3$) and shift pulses $\phi_1$ and $\phi_2$.

The first, second, and third reset pulses $\phi r_1$, $\phi r_2$, $\phi r_3$ are transmitted from the circuit 29 to the reset circuits 20, 22 and 24. Also, the first, second, and third shift pulses $\phi t_1$, $\phi t_2$, $\phi t_3$ are transmitted to the transferring shift circuits 21, 23 and 25. Further, the shift pulses $\phi_1$ and $\phi_2$ are transmitted to the first and second shifting circuits 27 and 28, respectively.

In accordance with the focus state detection device constructed as mentioned above, the user observes to confirm the photographing image through the eyepiece lens (finder lens) 13 through which the view field including the subject positioned in the front ward of the lens 15c can be seen through the lens 15c, the mirrors 8c and 11 and the lens 12.

In the above-mentioned structure, the observed view through the finder lens corresponds to the image which is actually to be photographed. After the photographing composition is determined by the user, the subject is positioned in the distance measuring area displayed in the center area of the finder view. After that, the shutter is half pressed to measure the distance to the subject and the lens is locked in the in-focus state. In this state, the shutter is fully pressed to expose the film.

The distance is measured with the use of the optical flux P1 formed by the first conversional system, the optical flux P2 formed by the second conversional system and the optical flux including the optical axis P3 formed by the third conversional system.

FIGS. 7 to 10 represent a flow chart of the auto focusing sequence in accordance with the focus state detection device of the present invention mentioned above.

Figure 11:
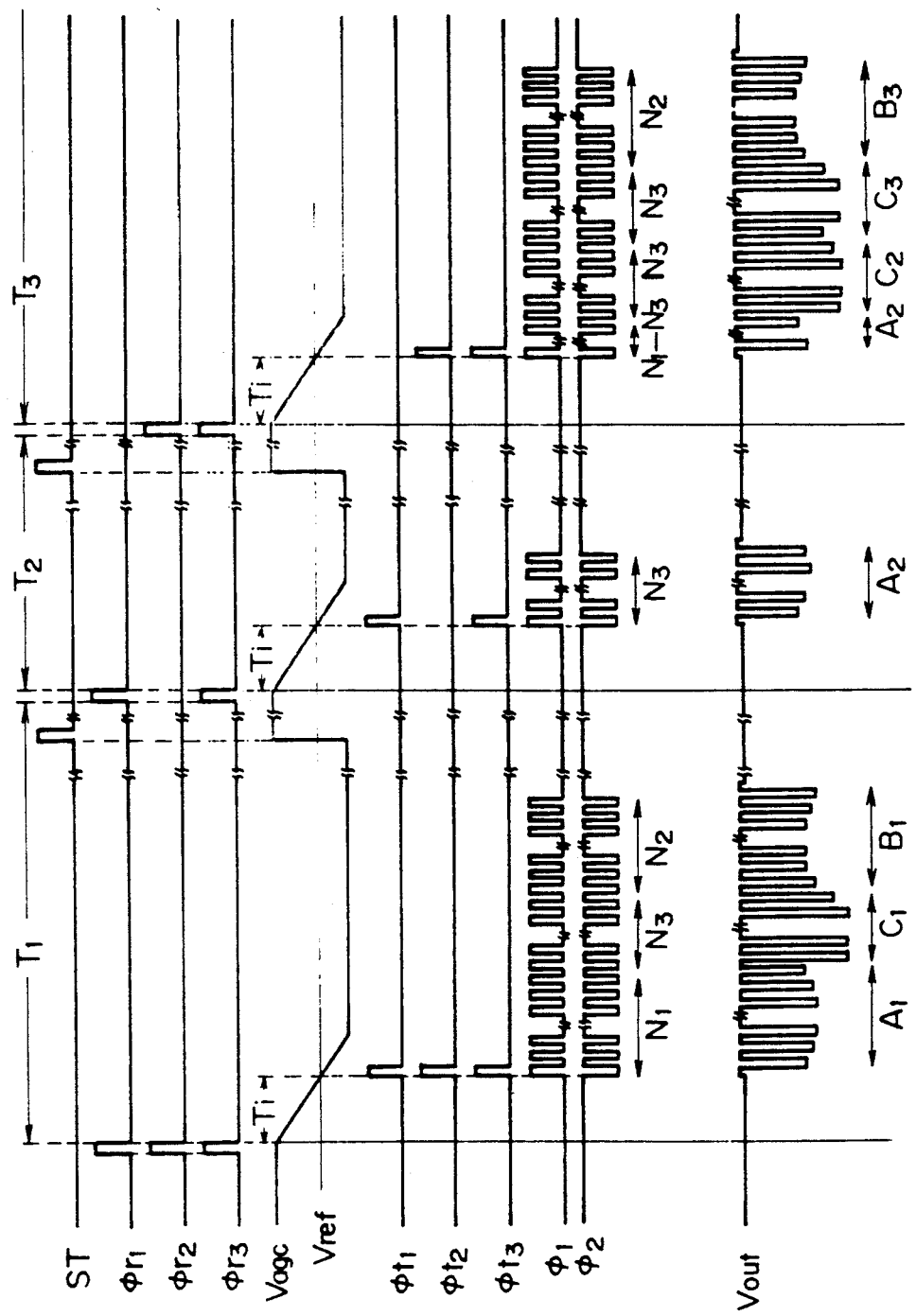
FIG. 11 is an explanatory view of waveforms to explain the function of the embodiment of FIG. 2.

When the shutter button is half pressed to start the sequence of the auto focusing function, the CCD is initialized in step S1 so that all of the data remaining in the register 26 is deleted to clear the register. After that, the timer starts to function in step S2. Then in step S3, the reset pulses $\phi r_1$, $\phi r_2$, $\phi r_3$ rise to the level "H", as illustrated in FIG. 11, so that the remaining electric charges in the converter elements of the converter portions 17, 18 and 19 are cleared through the reset circuits 20, 22 and 24, respectively.

In step S4, the reset pulses $\phi r_1$, $\phi r_2$, $\phi r_3$ fall to the level "L", which actuates the converter portions 17, 18 and 19 to start the integration function so that the electric charges are accumulated in the converter elements of the portions 17, 18 and 19 according to the optical intensity distributions of the three optical fluxes mentioned above.

After that, in step S5, the output voltage Vagc of the monitor unit 30 is compared with the reference voltage Vref. When the output voltage Vagc becomes lower than the reference voltage Vref, the shift pulses $\phi t_1$, $\phi t_2$, $\phi t_3$ are raised to the level "H" in step S6. Then the shift counter is set as N=1, in step S7. After that, the flow moves to step S8.

In step S8, the shift pulse $\phi_1$ is raised to the level "H" while the other shift pulse $\phi_2$ is lowered to the level "L". Then, the pixel data accumulated in the converter elements of the converter portions 17, 18 and 19 are output from the register 26 as an output Vout for one clock (one pixel). This output is converted to the digital data by an A/D converter (not shown) and registered in a RAM (not shown) as one pixel data.

The above-mentioned data registration step is repeated for a predetermined number of times more than the number of all of the pixels, that is, the number $N_1$ of the elements in the portion 17 plus the number $N_2$ of the elements in the portion 18 plus the number $N_3$ of the elements in the portion 19, i.e., $N_1+N_2+N_3$. It is to be noted that in this particular embodiment the numbers are arranged as $(N_1=N_2)>N_3$.

Figure 12:
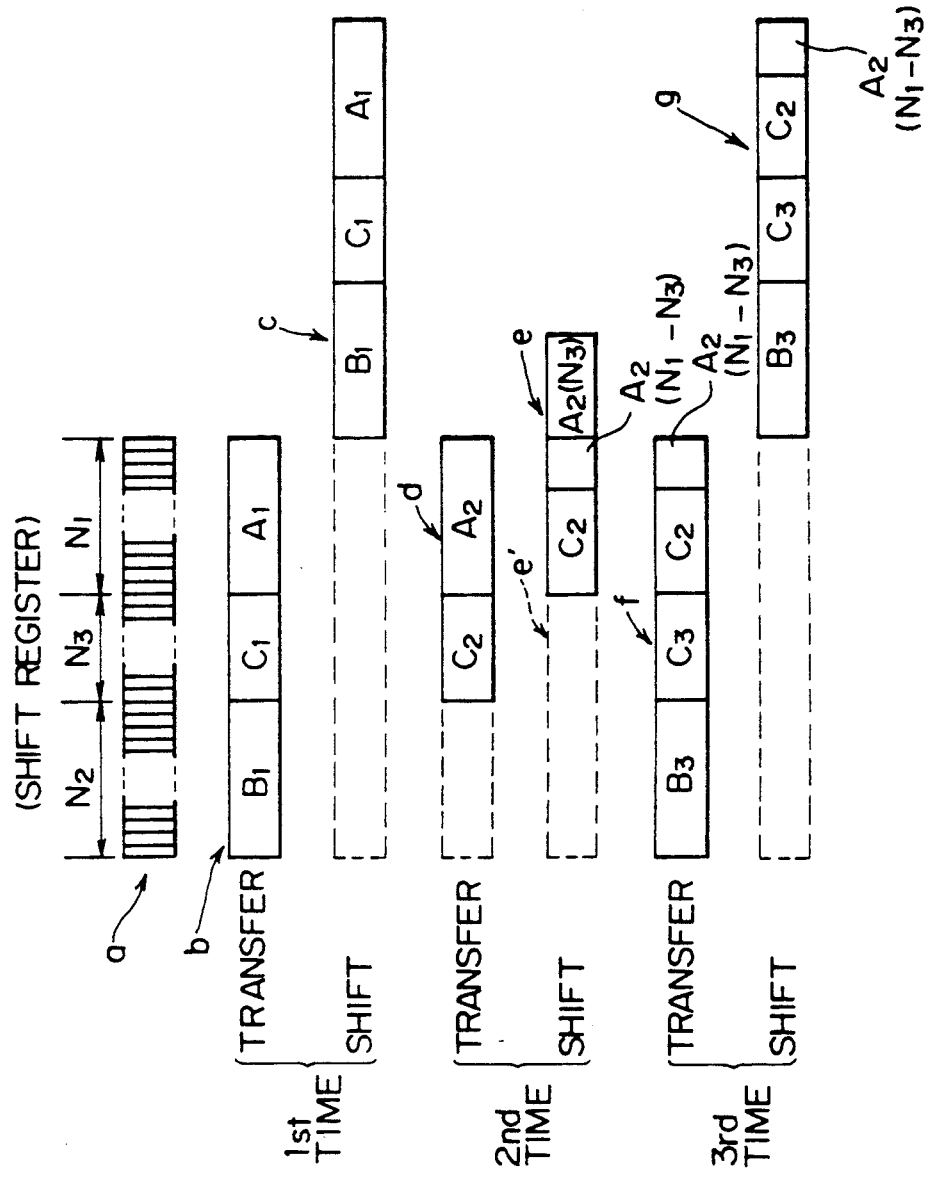
FIG. 12 is an explanatory view for explaining the function of data transfer and the output shift of the shift register of FIG. 6.

In this embodiment, the register 26 has a capacity equal to the number $N_1+N_2+N_3$, as indicated by reference letter a in FIG. 12. Therefore, the transferring function carried out in step S6 is represented by reference letter b in FIG. 12.

In step S9, whether $N \geq N_1+N_2+N_3$ is discriminated each time one pixel data is registered in step S8. If the discrimination result is NO, the number N is increased by one increment as N=N+1, in step 10.

On the other hand, if the discrimination result is YES in step S9, the data registered in all of the pixel elements in the register 26 is output from the register in order of the first array data $A_1$ for the first detecting operation, the third array data $C_1$ for the first detecting operation, and the second array data $B_1$ for the first detecting operation, as indicated by reference letter c in FIG. 12. Thereby, the first data taking out process is ended and the flow moves to the second process of data taking out sequence illustrated in FIG. 8.

Figure 8:
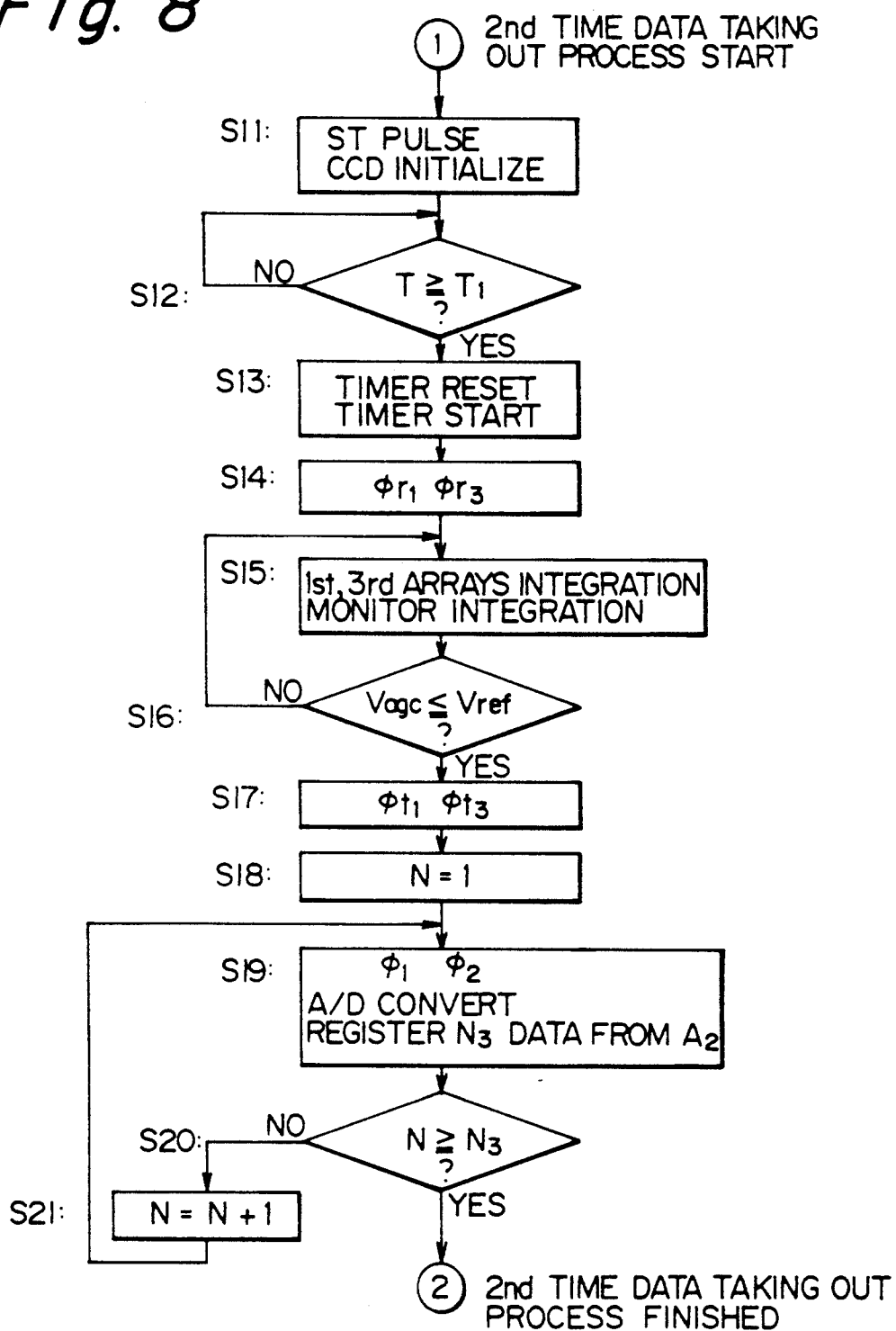
FIG. 8 is a flow chart of function subsequent to the flow of FIG. 7.

In FIG. 8, the pulse ST is raised up to the level "H" to initialize the monitor unit 30 in step S11. The unit 30 is electrically charged to a predetermined level of a stand-by state. Also, the converter portions 17, 18 and 19 are initialized.

In step S12, it is discriminated whether the time elapsed from the starting point of the timer circuit drive in step S2 exceeds a predetermined time $T_1$ or not. If the discrimination result is YES, the timer is reset and simultaneously started to be driven again in step S13. In step S12, if the discrimination result is NO, the step is repeated until it becomes that $T \geq T_1$ without moving to subsequent step S13.

The reason for discriminating whether $T \geq T_1$ in step S12 is that the time Ti changes according to the luminance of the subject, which time Ti is the time required for obtaining the state that the output voltage Vagc becomes equal to the reference voltage Vref in step S5. When the luminance is high, the time is shortened while when the luminance is low, the time is elongated.

Therefore, if the luminance is extremely low, a very long time is required for obtaining the pixel data from the conversional portions 17, 18 and 19, which results in that the total time for auto focusing function becomes extremely long. To cope with this problem, a specific time $T_1$ is predetermined corresponding to a minimum value of the subject luminance so that the process for taking the data out of the conversional portions 17, 18 and 19 is stopped when the time $T_1$ is elapsed and the functional flow is moved to the subsequent step compulsorily.

When the timer is actuated in step S13, the first and third reset pulses $\phi r_1$ and $\phi r_3$ are raised up to the level "H" so that the portions 17 and 19 are reset through the reset circuits 20 and 24 and simultaneously with that the integration process in the pixels is started in response to the optical intensity distribution of the optical fluxes. Also, at the same time, the monitor unit 30 is reset and started to conduct the integration function.

In the next step S16, it is discriminated whether $Vagc \leq Vref$ or not similarly to step S5. If the output voltage Vagc of the monitor unit 30 becomes lower than the reference voltage Vref, the flow moves to step S17 in which the first and third shift pulses $\phi t_1$ and $\phi t_3$ are raised up to the level "H" so that the data of the first and third conversional portions 17 and 19 are transferred to the shift register 26 through the shifting circuits 21 and 25, as indicated by reference letter d in FIG. 12.

In next step S18, the clock of the shift counter is set as N=1.

After that, in step S19, the shift pulse $\phi_2$ is raised up to the level "H" while the pulse $\phi_2$ is lowered to the level "L". Then, the pixel data accumulated in the elements of the first portion 17 is output from the register 26 as an output Vout for one clock (one pixel). This output Vout is converted to a digital data by an A/D converter and registered in the RAM as a data of one pixel.

Such a data registration process is repeated until the number $N_3$ of the third portion 19 is cleared.

More precisely, each time one pixel data is registered in step S19, it is discriminated whether $N \geq N_3$ or not in step S20. If the discrimination result is NO, the flow moves to step S21 in which the number N is increased by one increment as N=N+1.

Figure 9:
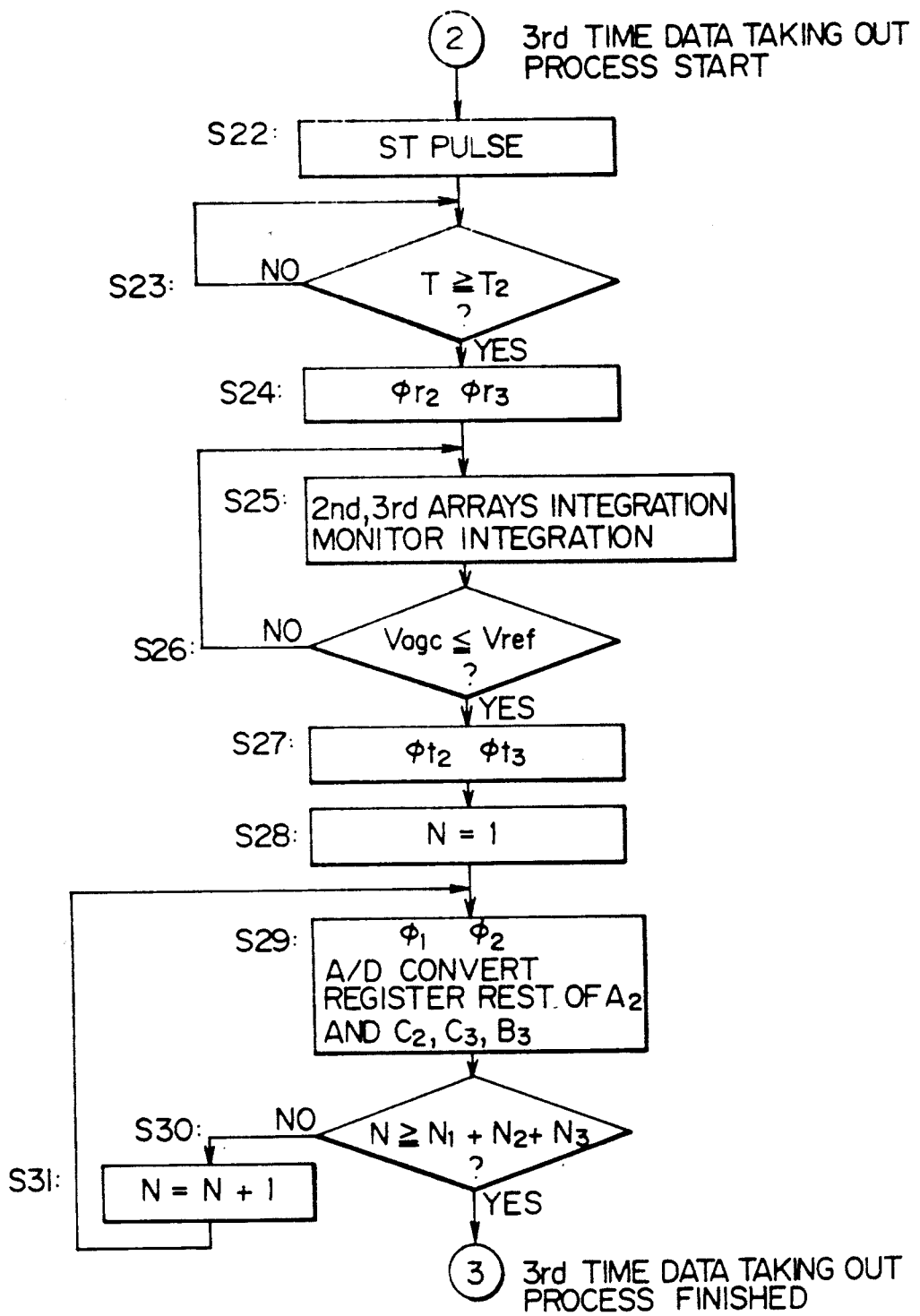
FIG. 9 is a flow chart of the function subsequent to the flow of FIG. 8.

On the other hand, if the discrimination result in step S20 is YES, $N_3$ pixel data out of the first portion 17, that is, $N_3$ pixel data out of the first data array of the second detection process are output from the register 26 so that the process for obtaining the data for the second time as illustrated in FIG. 8 is ended and the flow moves to the process illustrated in FIG. 9 for obtaining the data for the third time.

In step S22 of FIG. 9, the ST pulse is raised up to the level "L" so as to initialize the monitor unit 30 so that the unit 30 is electrically charged to a predetermined level and becomes to be in a stand-by state. Also, the first to third conversional portions 17, 18 and 19 are reset.

After that, in step S23, it is discriminated whether the time elapsed after the timer is actuated in step S13 exceeds a predetermined time $T_2$ or not. If the discrimination result is YES, the flow moves to the next step S24.

If the discrimination result in step S23 is NO, the step is repeated until the time becomes as $T \geq T_2$ instead of moving to the next step S24.

The reason for the discrimination of $T \geq T_2$ in step S23 is the same as the reason for the discrimination of $T \geq T_1$ in step S12 mentioned above.

If the discrimination result is YES in step S23, the second and third reset pulses $\phi r_2$ and $\phi r_3$ are raised to the level "H" in step S24, so that the second and third conversional portions 18 and 19 are reset and the integration function of the pixels is started in response to the optical fluxes received by the detecting portions. Also, at the same time, the monitor unit 30 is reset and starts to conduct the integration function.

In the next step S26, the output voltage Vagc of the monitor unit 30 is compared to the reference voltage Vref in the same manner as step S. When the voltage Vagc becomes lower than the voltage Vref, the flow moves to step S27 wherein the second and third shift pulses $\phi t_2$ and $\phi t_3$ are raised to the level "H" so that the data of the second and third converter portions 18 and 19 are shifted to the register 26 through the shift circuits 23 and 25.

Such a shift motion is represented by reference letter f in FIG. 12. That is, in the shift register 26, the data is shifted in the vacant region that remains in the register in the preceding shift motion for the second time, i.e., the vacant region other than the region for $N_1 - N_3$ data in the first data array $A_2$ of the second shift motion and the third data array $C_2$ of the second shift motion, i.e., the vacant region e' generated after $N_3$ data is shifted from the $A_2$ data in the secong shift motion.

Therefore, at the time when the function of step 27 is ended, the data in the register 26 is disposed in the order as $N_1 - N_3$ data of the first data array $A_2$ and the third data array $C_2$ already registered in the shift motion for the second time, the third data array $C_3$ for the third time shift motion and the second data array $B_3$ for the third time shift motion.

In the next step S28, the clock of the shift counter is set as N=1.

After that, in step S29, the shift pulse $\phi_1$ is raised to the level "H" while the shift pulse $\phi_2$ is lowered to the level "L" so that the pixel data for one clock (one pixel) registered in the elements of the first converter porion 17 is output from the register 26 as the output Vout which is converted to a digital data and registered in the RAM as one pixel data.

Such a function of data registration is conducted in such a way that the remaining number of data other than $N_3$ data in the pixel data $A_2$ of the first converter portion 17 is registered first and after that the data $C_2$ of the third converter portion 19 obtained by the second time data taking out operation is registered.

After that, the third array data $C_3$ obtained by the third time data taking out operation and the second data array $B_3$ obtained by the third time data taking out operation are registered in the RAM.

In the next steps S30 and S31, it is discriminated whether $N \geq N_1 + N_2 + N_3$ or not in the same way as the above-mentioned steps S9 and S10. When the discrimination result becomes YES, the data taking out function for the third time represented in FIG. 9 is ended and the flow of function moves to step S32 of FIG. 10 for calculating the distance to the subject.

Figure 10:
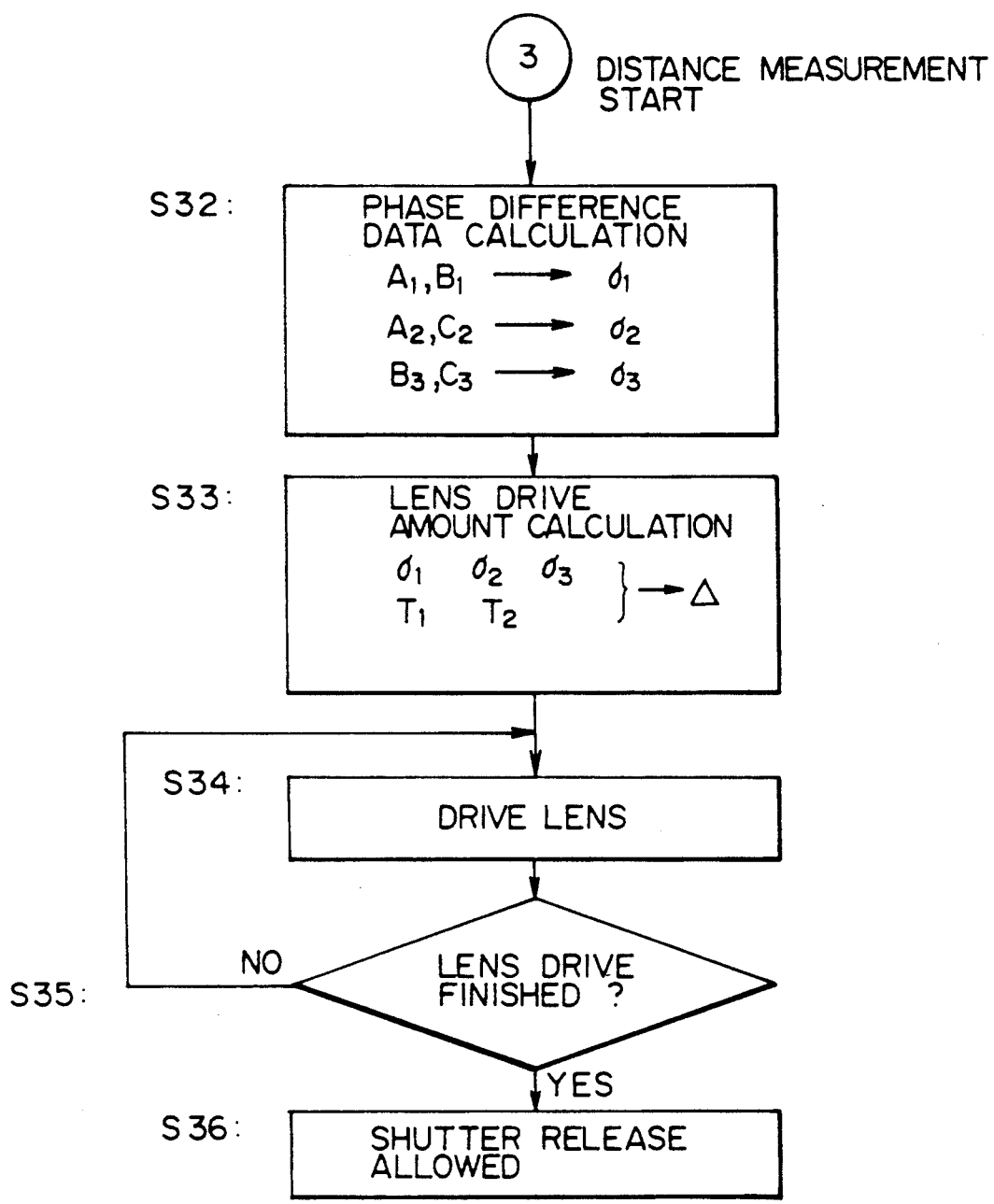
FIG. 10 is a flow chart of the function subsequent to the flow of FIG. 9.

In step S32 of FIG. 10, a first phase difference data $\sigma_1$ is calculated from the first data array $A_1$ and the second data array $B_1$ obtained in the first time process out of the data registered in the RAM in the previous steps S8, S19 and S29.

After that, a second phase different data $\sigma_2$ is calculated from the data $A_2$ and $C_2$, that is, the data $A_2$ which comprises $N_3$ data of the first array data $A_2$ obtained in the first time process and $N_1 - N_3$ data obtained in the third time process, and the data $C_2$ of the third array obtained in the second data registration process.

After that, a third phase difference data $\sigma_2$ is calculated from the second data array $B_3$ and the third data array $C_3$ obtained in the third data taking out process.

The lens drive amount $\Delta$ is calculated on the basis of five data, that is, the data $\sigma_1$, $\sigma_2$, $\sigma_3$ mentioned above, the time $T_1$ between the distance measurement points for the first time and the second time, and the time $T_2$ between the distance measurement points for the second time and the third time.

After that, in step S34, the focus drive ring of the photographing lens is driven.

After that, in step S35, it is discriminated whether the lens is driven by the amount of $\Delta$ calculated in step S33 or not, that is, the lens drive motion is ended or not. If the discrimination result is NO, the flow is moved back to step S34 wherein the lens is continued to be driven. On the other hand, if the discrimination result is YES, a series of sequence for the distance measurement, calculation and the lens drive is finished and the shutter is allowed to be released in step S36. In this state, the shutter button is full pressed from the half pressed state so that the film is exposed.

Therefore, in accordance with the embodiment of the present invention mentioned above, the pixel data is taken out prior to calculating the data in such a way that the first to third data are taken out in the first time process; a part of the second data is taken out in the second time process and the first to third data are taken out in the third time process and that the phase difference data is calculated in such a way that a first data is calculated from the data of two regions in both sides of the optical axis obtained in the first time process, that a second data is calculated from the data of the region including the optical axis and the data of the region outer the optical axis obtained in the second time process, and that a third data is calculated from the data of the region including the optical axis and the data of the region outer the optical axis obtained in the third time process. Therefore, it becomes possible to shorten the time for taking out the data as well as calculating the lens drive amount.

Also, in accordance with the above-mentioned embodiment, the ending timing of the integration function in the CCD is controlled according to the luminous amount of the light received by the monitor unit 30. Therefore, it becomes possible to avoid lowering the detection accuracy due to the change of subject luminance.

More precisely, according as the distance to the subject changes, the position of the subject image changes in the first and second converter portions 17 and 18. In this case, in accordance with the structure in which the monitor unit is disposed in the vicinity of the converter portions 17 and 18, it becomes difficult to obtain an accurate average value of the subject luminance due to the change of the distance to the subject, which lowers the reliability of distance measurement.

However, in accordance with the present invention, the monitor unit 30 is disposed in the vicinity of the light receiving element array of the third converter portion 19, which makes it possible to keep the monitor output unchanged irrespective of the change of the distance to the subject.

That is, the image received by the portion 19 is formed by the optical flux which is coaxial with the flux from the subject so that the image is not influenced from the change of the distance to the subject. Therefore, even if the distance is changed, the output from the portion 19 is not changed.

In the above-mentioned embodiment, the monitor unit 30 is disposed very close to the portion 19 but not strictly on the optical axis of the subject flux. However, the dislocation of the monitor from the optical axis is negligible in actual use.

Figure 20:
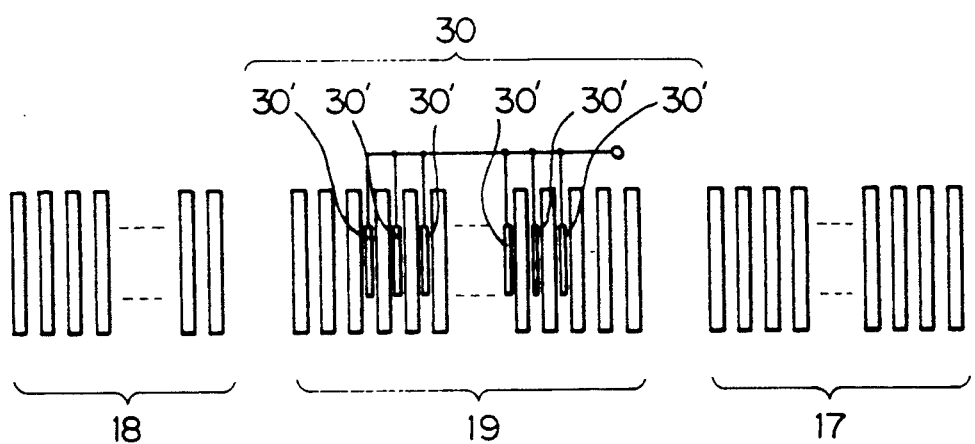
FIG. 20 is an explanatory view for explaining a variant of the monitor circuit of the present invention.

In general, the converter portions 17 to 19 and the monitor unit 30 are formed according to the process similar to that for producing the ordinary ICs. In that case, it sometimes becomes difficult to dispose the monitor 30 near the portion 19 according to the construction of the device or the producing cost may be increased. To cope with such a problem, the positional relation between the monitor 30 and the portion 19 may be arranged as illustrated in FIG. 20.

More precisely, the portion 19 which is disposed between the portions 17 and 18 comprises a number of minute light receiving elements. Between each adjacent two elements is disposed an auxiliary detector element 30' so that the outputs of the elements 30' are added to the output of the monitor 30.

By this arrangement, it becomes possible to obtain an average output of the same image as the image received by the portion 19 from the monitor unit 30.

Further, the distance measuring region disposed in the view field frame of the finder optical system is fixed with respect to the view field frame, it becomes possible to avoid focusing the portion other than the portion which the user intended to focus. That is, the parallax between the finder view field and the distance measuring region in the view field is minimized.

Also, in accordance with the embodiment of the present invention, the first and second conversional system comprising the lenses 15a and 15b, respectively, are arranged separately from the finder system, which elongates the base length so that the accuracy of the distance measurement can be raised.

It is to be noted that a part of the optical flux passing through the finder lens 15c may be divided by an appropriate means instead of arranging the first and second systems comprising the lenses 15a and 15b.

As mentioned above, in accordance with the embodiment of the present invention, the period for the electric charge accumulation (integration) for obtaining the first to third data array is set twice so that the lens drive amount $\Delta$ is calculated on the basis of the data obtained in each time of the integration process to drive the lens by the amount calculated to make the in-focus state. However, instead of such an arrangement, it may be possible to arrange the device in such a manner that the focus error amount is obtained first when the first to third data array are obtained for the first time process and that the lens is driven in response to the focus error amount to roughly position the lens at the in-focus position and after that the second and third electric charge accumulation steps are conducted to obtain the first to third data arrays according to which the lens is driven again so that the lens is accurately positioned at the in-focus position.

Such an arrangement is further described below with reference to FIGS. 13 to 18.

In a manner similar to the above-mentioned embodiment, the subject to be measured is positioned in the distance measuring region in the finder view field. After that, the shutter button is half pressed to start the sequence of the auto focusing function, as described hereinafter.

Figure 13:
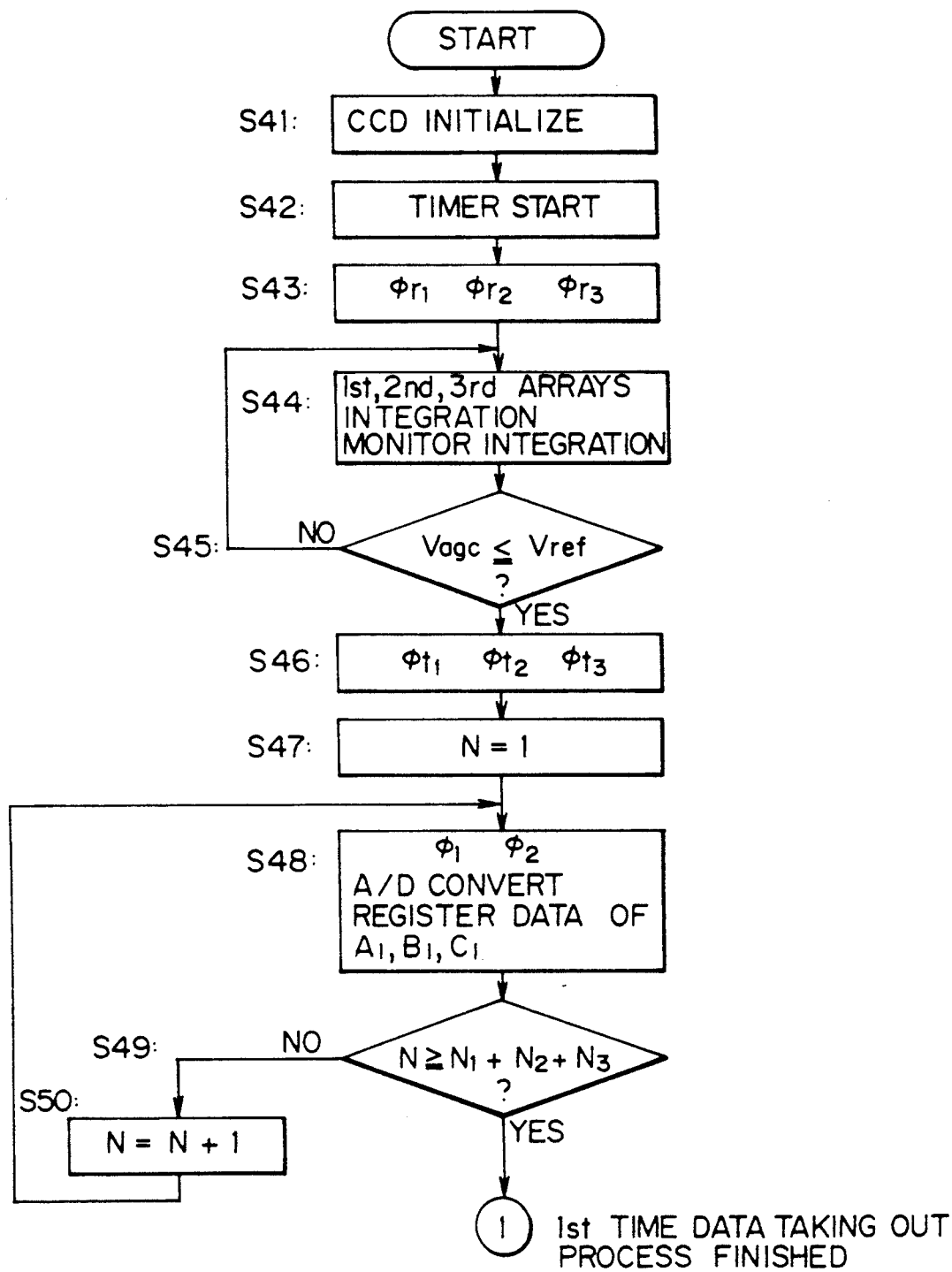
FIG. 13 is a flow chart of function in accordance with anther embodiment of the present invention.

First, in step S41 of FIG. 13, the CCD is initialized so that all of the data remaining in the shift register 26 are deleted to clear the register.

Figure 18:
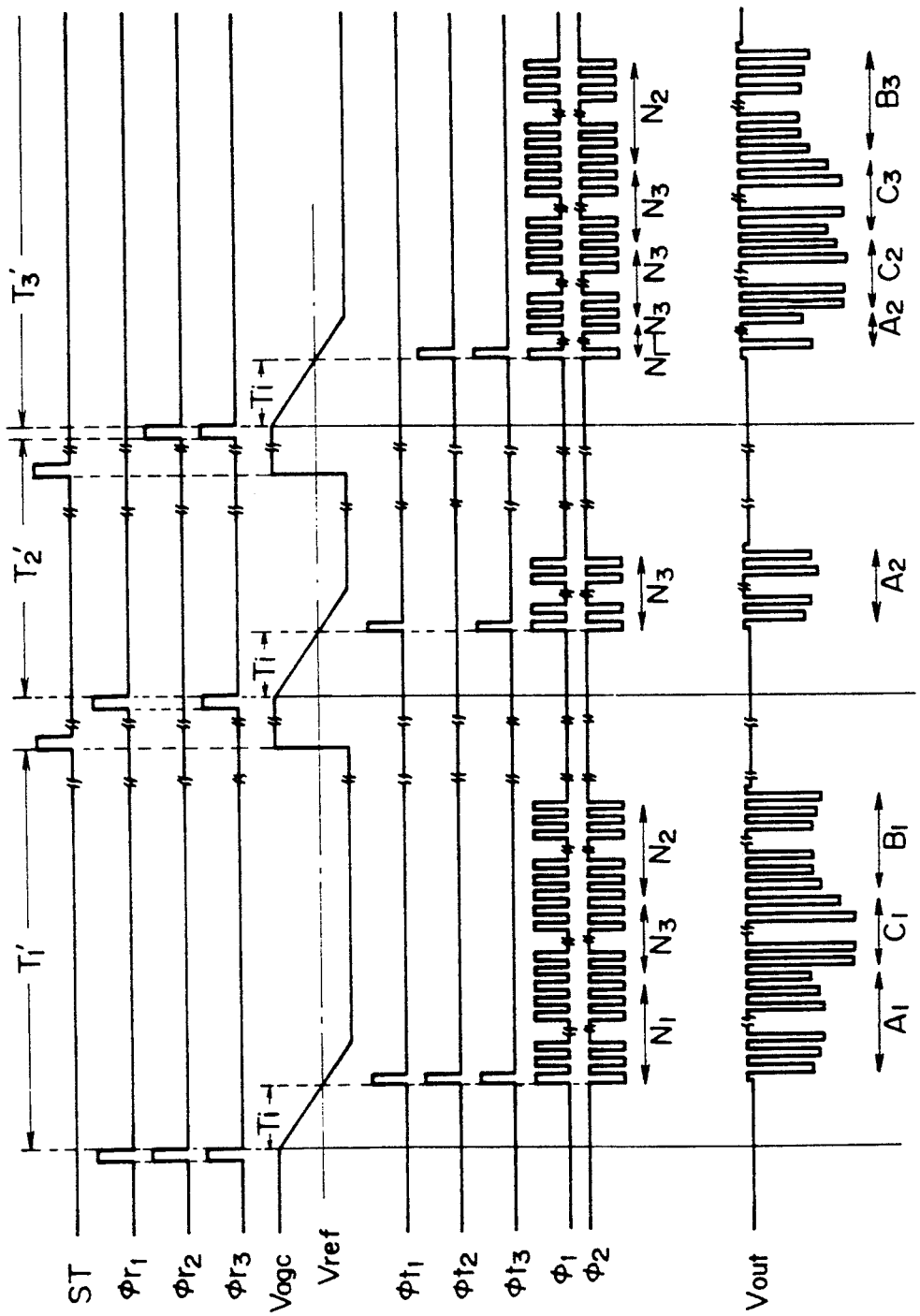
FIG. 18 is an explanatory view of waveforms to explain the function of the above-mentioned embodiment of the invention.

After that, in step S42, the timer is started. Also, in step S43, the first to third reset pulses $\phi r_1$, $\phi r_2$ and $\phi r_3$ are raised to the level "H" as illustrated in FIG. 18 so that electric charges remaining in the first to third conversional portions 17 to 19 are cleared through the first to third reset circuits 20, 22 and 24.

Then in step S44, the reset pulses $\phi r_1$, $\phi r_2$ and $\phi r_3$ are lowered to the level "L" so as to start the integration function in the portions 17 to 19 so that electric charges are accumulated in the converter elements of the portions 17 to 19 in response to the optical intensity distribution of the three light fluxes mentioned before.

After that, in step S45, the output voltage Vagc of the monitor unit 30 is compared with the reference voltage Vref. When the voltage Vagc becomes lower than the voltage Vref, the flow moves to the subsequent step S46 in which the shift pulses $\phi t_1$, $\phi t_2$ and $\phi t_3$ are raised to the level "H".

Then, the shift counter is set as N=1 in step S47.

After that, in step S48, the shift pulse $\phi_1$ is raised to the level "H" while the other shift pulse $\phi_2$ is lowered to the level "L". Thereby, the pixel data accumulated in the elements of the portions 17 to 19 are output from the register 26 as an output Vout for one pixel. The output Vout is converted to a digital signal and registered in the RAM as one pixel data.

The above-mentioned data registration function is repeated until the number N becomes $N_1+N_2+N_3$ wherein $N_1$ represents the number of pixels in the first portion 17, $N_2$ represents the number of pixels in the second portion 18 and $N_3$ represents the number of pixels in the third portion 19, respectively. It is to be noted that $(N_1=N_2)>N_3$ in this particular embodiment.

In step S49, each time the data for one pixel is registered in step S48, it is discriminated whether $N \geq N_1+N_2+N_3$ or not.

If the discrimination result is NO, the flow moves to step S50 wherein the number N is increased by one increment as N=N+1.

On the other hand, if the discrimination result is YES in step S49, that is, when the data of total number of pixels are output from the register 26, the data taking out operation for the first time is finished. The flow moves to the sequence of FIG. 14 to drive the lens for the first time.

Figure 14:
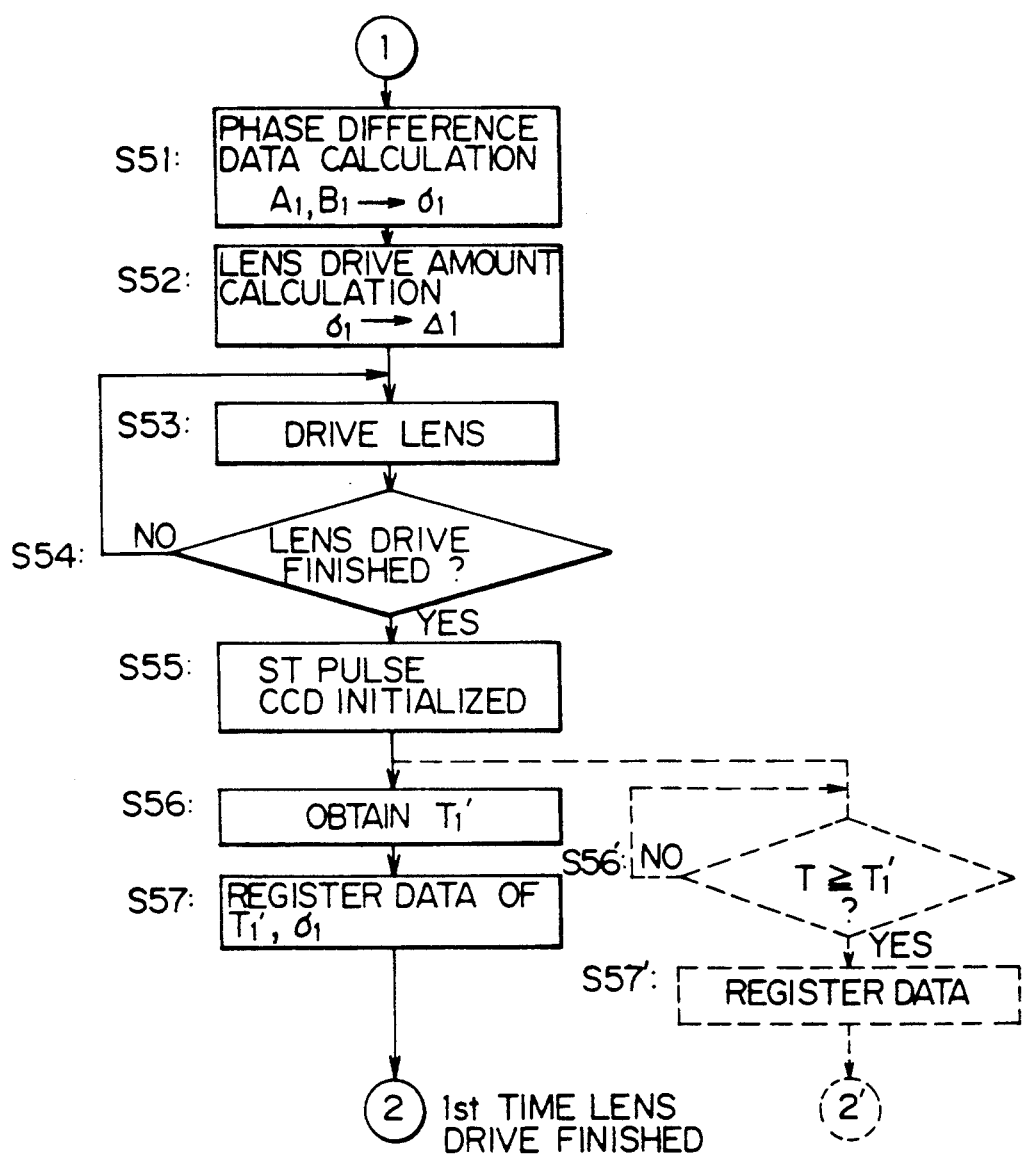
FIG. 14 is a flow chart of the function subsequent to the flow of FIG. 13.

In step S51 of FIG. 14, a first phase difference data $\sigma_1$ is obtained from the first array of pixel data $A_1$ and the second array of data $B_1$ registered in the RAM in step S48.

In step S52, the lens drive amount $\Delta 1$ is obtained on the basis of the first phase difference data $\sigma_1$.

After that, in step S53, the lens is driven.

Also, in step S54, it is discriminated whether the lens drive motion is finished or not. If the discrimination result is NO, the flow moves back to step S53 wherein the lens is continued to be driven. On the other hand, if the discrimination result is YES, the flow moves to the next step S55 wherein the ST pulse is raised to the level "H" so that the CCD is initialized as in the above-mentioned step S41.

In the next step S56, the time $T_1'$ from the start point of the distance measurement to the end point of the lens drive motion is calculated.

In step S57, the data of time $T_1'$ is registered in the RAM. Also, the phase difference data $\sigma_1$ obtained in step S51 is registered in the RAM. Thereby, the lens drive operation for the first time represented in the flow chart of FIG. 14 is finished and the flow moves to the next sequence of the lens drive operation for the second time represented in FIG. 15.

Figure 15:
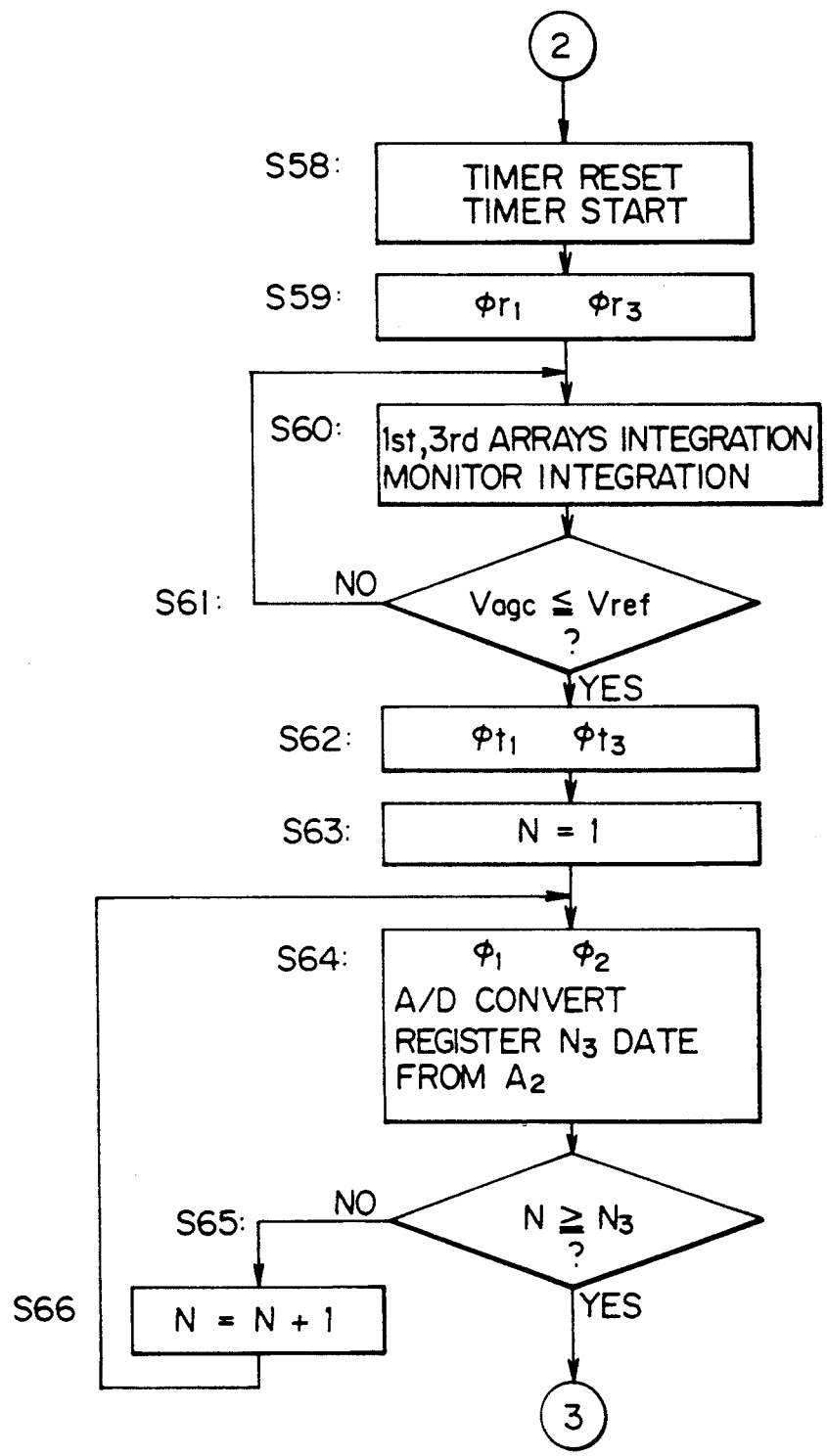
FIG. 15 is a flow chart of the function subsequent to the flow of FIG. 14.

In step S58 of FIG. 15, the timer is reset and driven.

In the next step S59, the first and third reset pulses $\phi r_1$ and $\phi r_3$ are raised to the level "H" as illustrated in FIG. 18 so that the electric charges remaining in the photoelectric elements of the optical converter portions 17 and 19 are cleared through the reset circuits 20 and 24.

Then, in step S60, the reset pulses $\phi r_1$ and $\phi r_3$ fall down to the level "L" so that the integration function is started in the portions 17 and 19 wherein electric charges are accumulated in the elements of the portions 17 and 19.

After that, in step S61, the output voltage Vagc of the monitor unit 30 is compared with the reference voltage Vref. When the voltage Vagc becomes lower than the voltage Vref, the flow moves to step S62 in which the first and third shift pulses $\phi t_1$ and $\phi t_3$ are raised to the level "H".

In step S63, the shift counter is set as N=1.

After that, in step S64, the shift pulse $\phi_1$ is raised to the level "H" while the other shift pulse $\phi_2$ is lowered to the level "L". Thereby, the pixel data registered in the elements of the converter portions 17 and 19 are output from the register 26 as an output Vout for one pixel. The output is converted to a digital signal and registered in the RAM as data of one pixel.

Such a data registration function is repeated until the number becomes $N_3$ which is the number of the pixel of the third converter porion 19. That is, each time one pixel data is registered in step S64, whether $N \geq N_3$ is discriminated in step S65. If the discrimination result is NO, the flow moves to step S66 wherein the number is increased by one increment as $N = N + 1$.

On the other hand, if the discrimination result is YES in step S65, which means that $N_3$ data are output from the register 26, the data taking out operation for the second time is conducted and the series of steps of FIG. 15 is finished. The flow moves to the sequence for taking out data for the third time as illustrated in FIG. 16.

Figure 16:
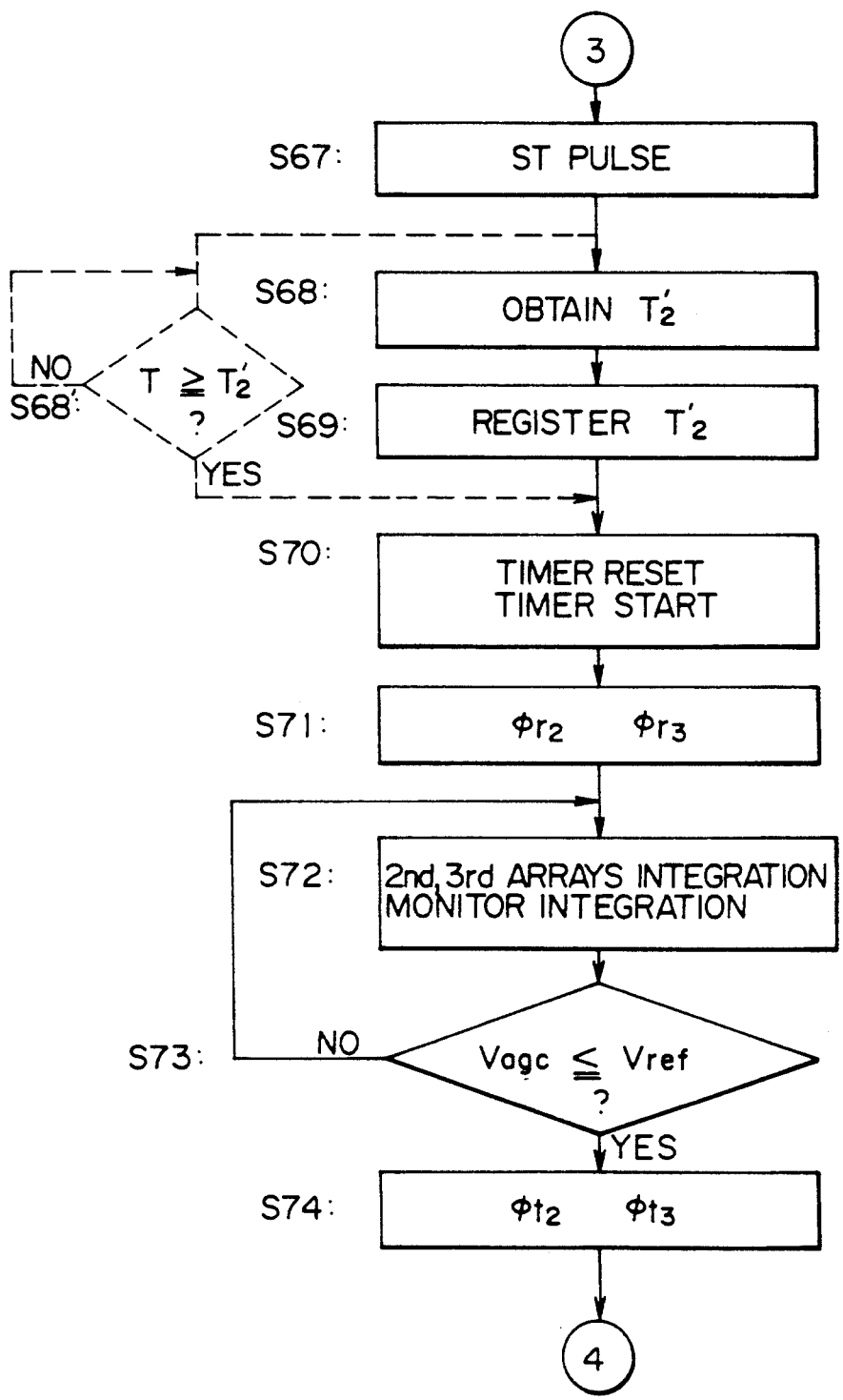
FIG. 16 is a flow chart of the function subsequent to the flow of FIG. 15.

In step S67 of FIG. 16, the pulse ST is raised to the level "H" so that the monitor unit 30 is electrically charged to a predetermined level and becomes to be in a stand-by state.

In the next step S68, the time $T_2'$ is measured by the timer which is started to function in step S58, which time $T_2'$ represents the time from the starting point of the data taking out operation for the second time (falling point of the reset pulses $\phi r_1$ and $\phi r_3$ to the level "L") to the starting point of the data taking out operation for the third time (rising point of the reset pulses $\phi r_1$ and $\phi r_3$ to the level "H").

In step S69, the data of the time $T_2'$ is registered in the RAM. Also, the timer is reset and started to function in step S70.

When the timer is started in step S70, the flow moves to step S71 wherein the second and third reset pulses $\phi r_2$ and $\phi r_3$ are raised to the level "H".

Then, the electric charge accumulating operation is started in the photoelectric elements of the monitor unit 30 and the second and third portions 18 and 19, respectively, in step S72.

After that, in step S73, the output voltage Vagc of the monitor unit 30 is compared with the reference voltage Vref. When the voltage Vagc becomes lower than the voltage Vref, the flow moves to step S74 wherein the second and third shift pulses $\phi t_2$ and $\phi t_3$ are raised to the level "H" so that the series of steps of FIG. 16 is finished and the flow moves to the sequence of FIG. 17.

Figure 17:
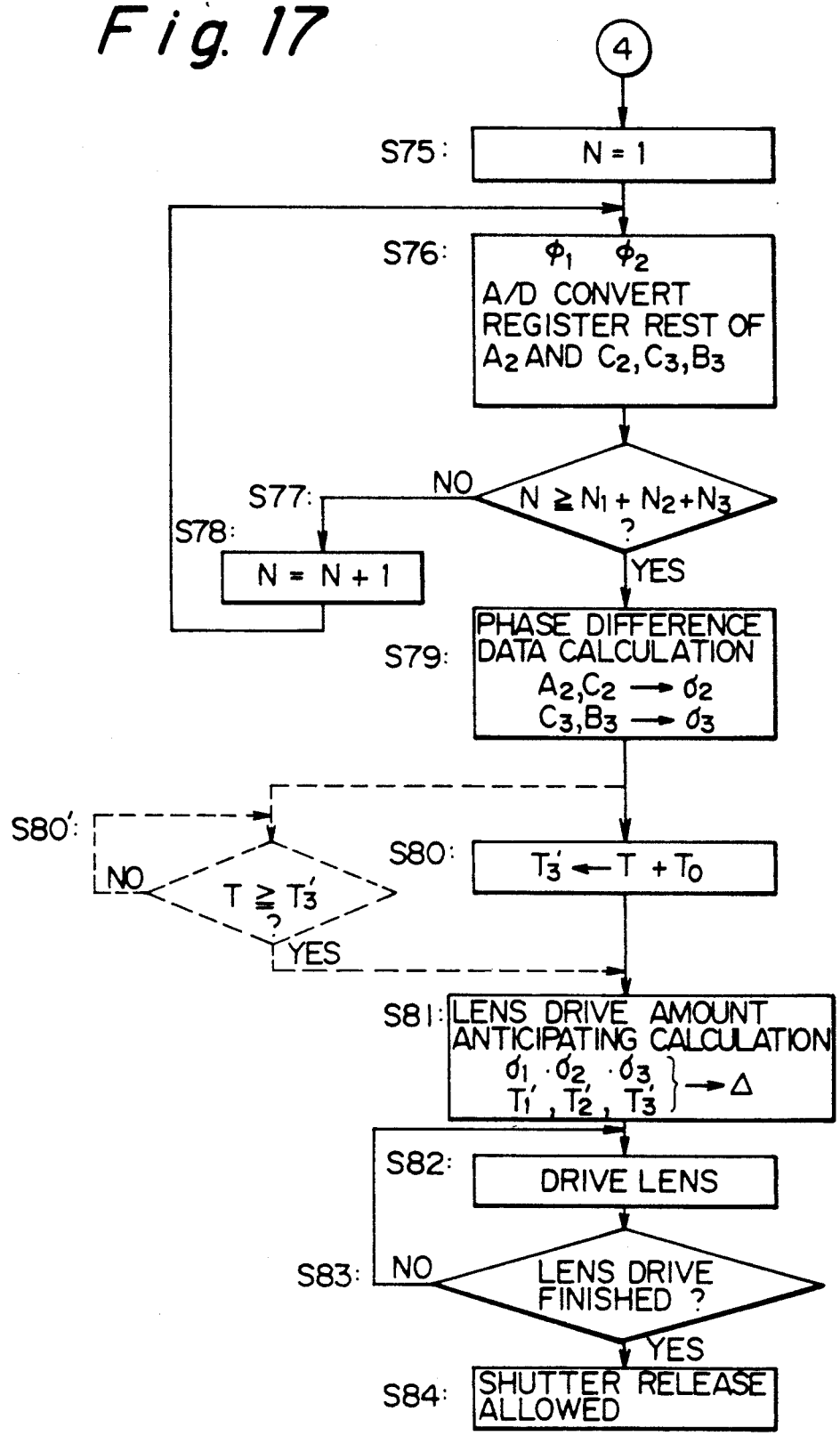
FIG. 17 is a flow chart of the function subsequent to the flow of FIG. 16.

In step S75 of FIG. 17, the shift counter is set as N=1 and the flow moves to step S76.

In step S76, the shift pulse $\phi_1$ is raised to the level "H" while the other shift pulse $\phi_2$ is lowered to the level "L" whereby the pixel data accumulated in the elements of the converter portions 18 and 19 are output from the register 26 as an output Vout for one clock (one pixel). The output is converted to a digital signal and registered in the RAM as one pixel data.

Such a data registration function is continued until the shift operations are finished with regard to $(N_1 - N_3)$ pixel data of the second portion 18, the data $C_2$ and $C_3$ obtained in the steps for second time and third time, respectively, and the data $B_3$ obtained in the steps for the third time.

More precisely, each time one pixel data is registered in step S76, whether $N \geq N_1 + N_2 + N_3$ or not is discriminated in step S77. If the discrimination result is NO, the flow moves to step S78 wherein the number is increased by one increment as $N = N + 1$. On the other hand, if the discrimination result is YES in the step S77, which means that all of the data are registered, the flow moves to step S79.

In step S79, the second phase difference data $\sigma_2$ is obtained from the data $A_2$ and $C_2$ registered in step S76 and the third phase difference data $\sigma_3$ is obtained from the data $B_3$ and $C_3$.

After that, in step S80, the time $T_3'$ is calculated, which time represents the time elapsed by the timer started in step S70 plus the shutter releasing time, that is, the necessary time $T_0$ required for calculation, mirror up motion and focusing motion after the step S79 is finished.

In the subsequent step S81, the lens drive amount $\Delta$ is calculated on the basis of six data, i.e., the first phase difference data $\sigma_1$ obtained in step S51, the second and third phase difference data $\sigma_2$ and $\sigma_3$ obtained in step S79, the time $T_1'$ obtained in step S56, the time $T_2'$ obtained in step S68 and the time $T_3'$ obtained in step S80.

The drive amount Δ corresponds to, for example, the pulse number of photointerrupter which cooperates with the focusing drive ring. The lens is driven in response to the pulse number in step S82.

In step S83, it is discriminated whether the pulse number comes to a predetermined number or not, that is, whether the count number of the subtraction counter is zero or not. If the discrimination result is YES, the lens drive is supposed to be finished and the flow moves to step S84 wherein the shutter is allowed to be released so that the shutter is fully pressed from the half pressed state so that the film is appropriately exposed.

It is to be noted that the time data $T_1'$, $T_2'$ and $T_3'$ obtained in steps S56, S68 and S80, respectively, are not fixed values but read from the timer. However, the data may be determined from a number of experimental data of actual photographing results.

In that case, a part of the flow chart is changed to as illustrated by dash lines in FIGS. 14, 16 and 17.

That is, the steps S56 and S57 of solid line are replaced by steps S56' and S57' of dash line, and similarly the two steps S68 and S69 are replaced by one step S68' and also the step S80 is replaced by step S80'. The other steps are unchanged.

Therefore, after the converter portions 17 to 19 are initialized in step S55, it is discriminated whether the time now reaches the time $T_1'$ in step S56'. If the discrimination result is YES, the data $\sigma_1$ obtained in step S51 is registered in the RAM. After that, the sequence is the same as mentioned above until the step S67.

In step S67, the pulse ST is raised to the level "H" and after that, it is discriminated whether the time now has reached the time $T_2'$ or not in step S68'. If the discrimination result is YES, the flow moves to step S70 wherein the timer is reset and started again. After that, the sequence is the same as mentioned before until step S79 wherein the phase difference data $\sigma_2$ and $\sigma_3$ are calculated.

After that, in step S80', it is discriminated whether the time now has reached the time $T_3'$ or not. If the discrimination result is YES, the flow moves to the next step S81 wherein the lens drive amount is calculated. After that, the sequence is the same as mentioned before.

In accordance with the embodiment mentioned above, the focusing control is conducted in such a way that the lens is temporarily moved to the infocus position in response to the distance measurement result for the first time and after that the lens is driven again in response to the measurement results for the second and third times, which makes it possible to shorten the total time for focusing the lens.

Also, in accordance with the embodiment of the present invention mentioned above, the pixel data are taken out prior to calculation of the data in such a way that the first to third pixel data are taken out in the sequence for the first time, that a part of the second pixel data is taken out in the sequence for the second time, and that the remaining part of the second pixel data and the first and third pixel data are taken out in the sequence for the third time, which makes it possible to shorten the time for taking out the pixel data.

Further, it becomes possible to remove the parallax between the finder view field and the distance measuring region which makes it possible to avoid unintentional focusing on a portion other than the portion of user's intention.

Also, in accordance with the embodiment of the present invention mentioned above, the ending timing of the optical integration by the first to third converter portions 17 to 19 is controlled accurately in response to the luminance of the subject irrespective of the distance to the subject, which makes it possible to raise the reliability of the data.

Besides, in accordance with the embodiment mentioned above, the monitor unit 30 is disposed at the same position as the image formed by the received light in the third converter portion 19, which makes it possible to avoid difficulty of producing the device and increasing of the cost.

It is to be noted that the present invention is not limited to the embodiments mentioned above. Various variants can be realized within the scope of the present invention.

For example, in the distance measuring optical system of the embodiment mentioned above, the optical flux of the region including the optical axis of the finder view field is guided to the third conversional system. However, it may be possible to arrange in such a manner that the light passing along the optical axis of the photographing lens is guided to the first to third conversional system, respectively, as illustrated in FIG. 19.

Figure 19:
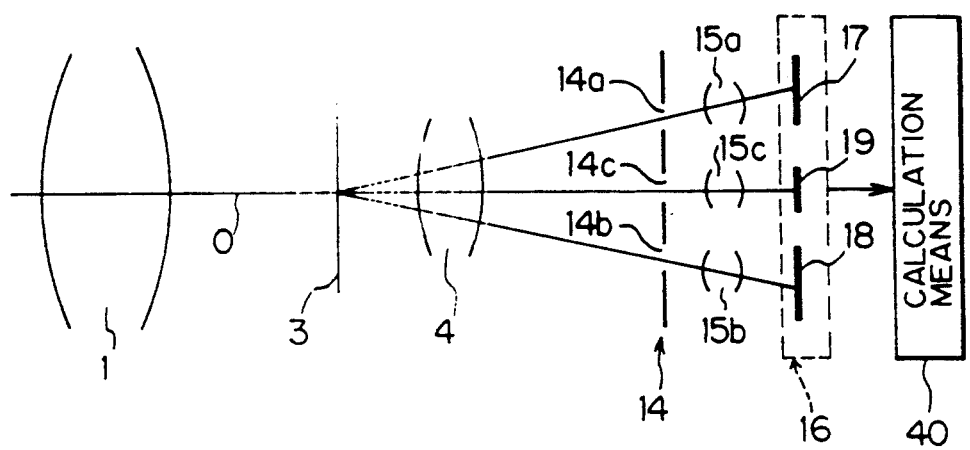
FIG. 19 is a constructional view of still another embodiment of the present invention.

FIG. 19 illustrates an optical path arrangement in accordance with another embodiment of the present invention.

An assumptional image forming plane 3 is positioned at an equivalent position of the film (not shown) behind the lens 1. The first to third conversional optical systems are disposed behind the image plane 3. That is, a condenser lens is disposed behind the plane 3 so as to converge the subject image formed on the plane 3. Also, behind the lens 4 is disposed a mask 14 which has a first hole 14a, a second hole 14b and a third hole 14c. The holes 14a and 14b are arranged for passing optical fluxes of the two regions symmetric with each other with respect to the optical axis 0 of the subject flux, respectively. The hole 14c is arranged for passing optical flux of the region including the optical axis 0 of the subject flux.

Behind the holes 14a, 14b and 14c of the mask 14, reimage forming lenses 15a, 15b and 15c are disposed, respectively. Also, behind the lenses 15a, 15b and 15c is disposed a photoelectric converter means (light receiving portion) 16 to which a calculation means 40 is connected.

The arrangement of the first hole 14a and the first lens 15a has a function to convert the positional change of the subject along the optical axis thereof to the change in the plane perpendicular to the optical axis. Therefore, the optical system composed of the hole 14a and the lens 15a is referred to as a first conversional optical system. Similarly, the optical system composed of the second hole 14b and the second lens 15b is referred to as a second conversional optical system.

On the other hand, the image formed by the optical flux being passed through the third arrangement of the hole 14c and the lens 15c is not changed on the plane perpendicular to the optical axis even when the position of the subject is changed along the optical axis.

The photoelectric converter means 16 is constituted from a CCD and has first to third converter portions 17, 18 and 19. The first portion 17 receives the optical flux which passes through the first hole 14a and which is converged by the first reimaging lens 15a. The second portion 18 receives the optical flux which passes through the second hole 14b and which is converged by the second lens 15b. Also, the third portion 19 receives the optical flux which passes through the third hole 14c and which is converged by the third lens 15c.

Also, as illustrated in FIG. 20, a monitor unit 30 is disposed in the vicinity of the element rows of the third portion 19 so as to monitor the optical amount of the light received by the portion 19. The output from the means 16 is transmitted to the calculation means 40.

In accordance with the arrangement mentioned above, not only is the photographing region not dislocated from the view observed through the finder but also the region where the distance is to be measured is confirmed through the finder in the state free from the parallax, which makes it possible to reliably focus on the desired subject.

The motion of the subject can be anticipated by the above-mentioned device according to the present invention. The anticipation function of the device is described hereinafter with reference to FIGS. 21, 22, 23 and 17.

Figure 21:
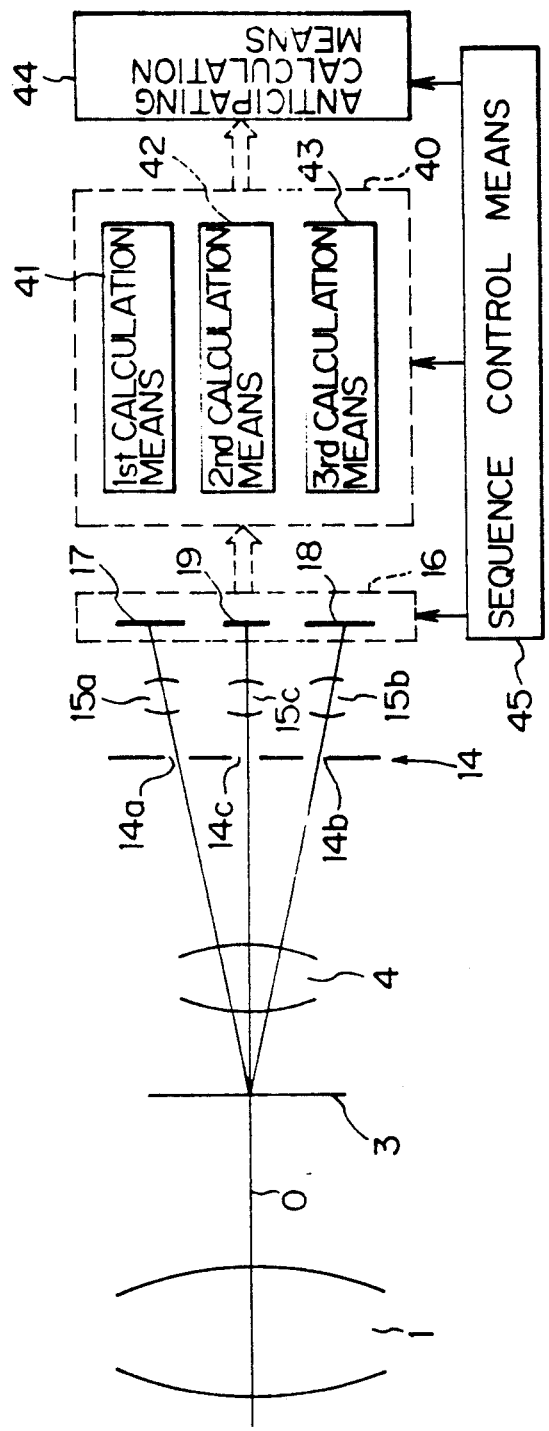
FIG. 21 is a constructional view of a further embodiment of the present invention.

In FIG. 21, the lens 1, the plane 3, the lens 4, the holes 14a to 14c (mask 14), the lenses 15a to 15c, and the portions 17 to 19 (conversional system 16) are the same as or correspond to those illustrated in FIG. 19.

The calculation means 40 which receives the outputs from the portions 17 to 19 comprises a first, second and third calculation means 41, 42 and 43.

The first calculation means 41 is arranged to calculate a first phase difference data from the first and second electric signals output from the portions 17 and 18, respectively.

Also, the second calculation means 42 is arranged to calculate a second phase difference data from the first and third electric signals output from the portions 17 and 19, respectively.

Also, the third calculation means 43 is arranged to calculate a third phase difference data from the second and third electric signals output from the portions 18 and 19, respectively.

The output from the calculation means 40 is transmitted to the anticipating calculation means 44. The photo-electric conversional unit 16 and the calculation means 40 and 44 are supplied with various control signals from the sequence control means 45.

The control means 45 controls the starting timing of the photo-electric converting function carried out in the first and second portions 17 and 18 of the unit 16 so as to take out the first and second signals in response to a starting signal for starting a series of focus state detection sequence, the starting signal, for example, being generated by half pressing the shutter button. After that, the control means 45 controls the starting timing of the photo-electric converting function carried out in the first and third portions 17 and 19 of the unit 16 so as to take out the first and third signals. And after that, the control means 45 controls the starting timing of the photo-electric converting function carried out in the portions 18 and 19 so as to take out the second and third signals.

The concrete example of the circuit of the conversional unit 16 is illustrated in FIG. 6 and described already referring the drawing.

It is to be noted that the control circuit 29 of FIG. 6 constitutes a part of the sequence control means 45 mentioned above and mainly controls the conversional unit 16.

The aforementioned sequence for calculating the focus state can be used as the sequence for anticipating the motion of subject. Therefore, the sequence after step S32 is described below with regard to the structure and function of the motion anticipating arrangement.

Figure 22:
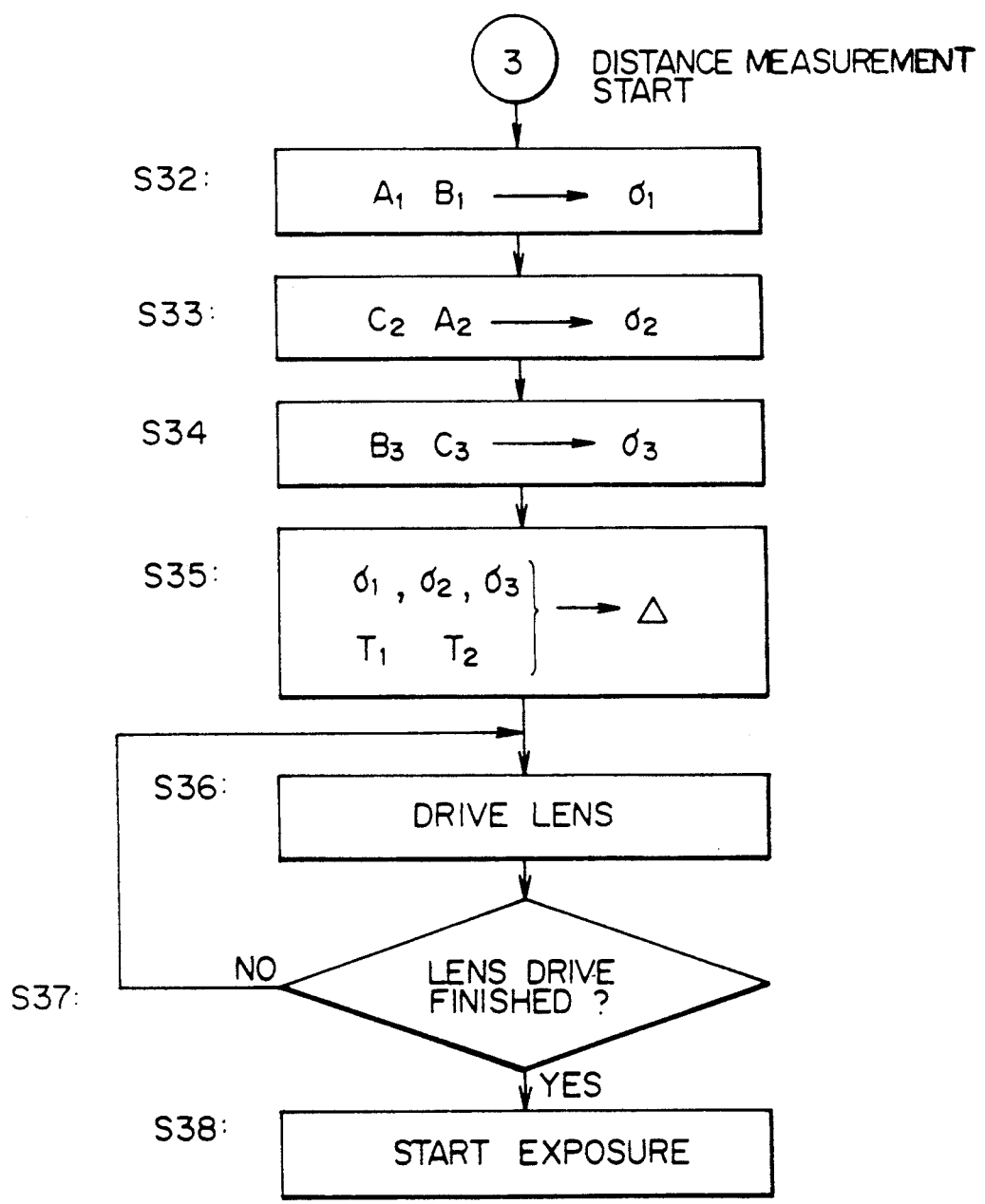
FIG. 22 is a flow chart of the function of the embodiment of FIG. 21.

In step S32 of FIG. 22, a first phase difference data $\sigma_1$ is obtained by the calculation means 41 of FIG. 21 on the basis of the data $A_1$ of the first array and the data $B_1$ of the second array obtained in steps S8, S19 and S29 of the first time sequence and registered in the RAM.

After that, in step S33, a second phase difference data $\sigma_2$ is obtained by the calculation means 42 on the basis of the data $A_2$ comprising $N_3$ data of the first array obtained in the second time sequence and $N_1-N_3$ data obtained in the third time sequence and the data $C_2$ of the third array obtained in the second time data registration sequence.

After that, in step S34, a third phase difference data $\sigma_3$ is obtained by the third calculation means 43 on the basis of the data $B_3$ of the second array and the data $C_3$ of the third array obtained in the third time data taking out step.

After that, in step S35, the lens drive amount $\Delta$ is obtained on the basis of five data, i.e., the phase difference data $\sigma_1$, $\sigma_2$, $\sigma_3$, the time $T_1$ between the distance measurement timing for the first time and that for the second time, and the time $T_2$ between the distance measurement timing for the second time and that for the third time.

In this anticipating calculation, if the three data $\sigma_1$, $\sigma_2$, $\sigma_3$ detected at different timings are the same, the subject is judged as being stationary and the drive amount $\Delta$ is calculated on the basis of these data.

Figure 23:
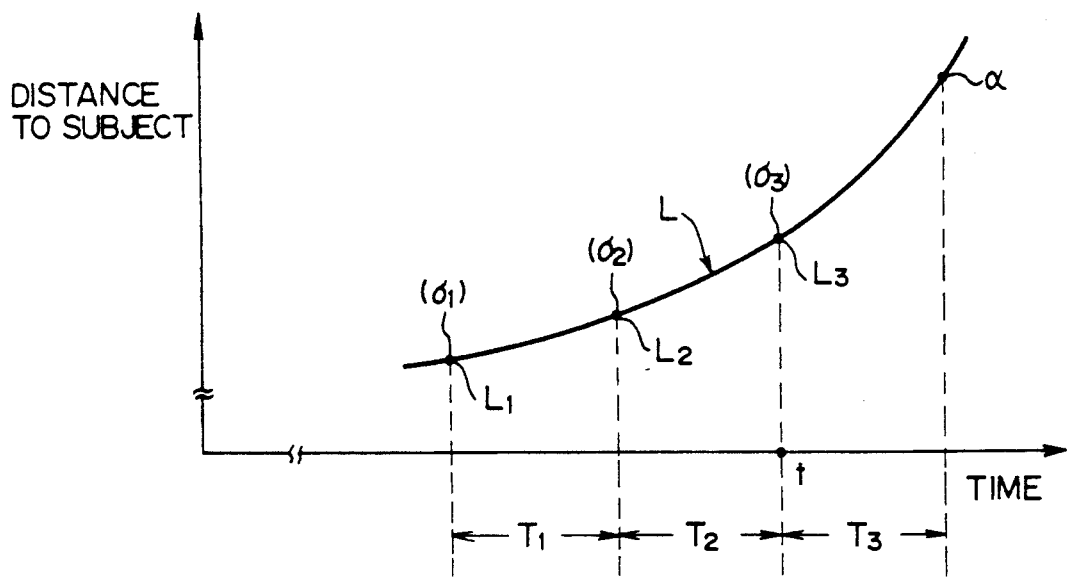
FIG. 23 is an explanatory view for explaining the function of the anticipatory calculation means used in the embodiment of FIG. 21.

On the other hand, if the three data $\sigma_1$, $\sigma_2$, $\sigma_3$ are different from each other, for example, the distance to the subject is changing from $L_1$ to $L_2$ to $L_3$ according as the time elapses, as represented in FIG. 23, the subject is judged as moving away from the camera. In this case, a line L which passes the points $L_1$, $L_2$, and $L_3$ is obtained and a time $T_3$ from the timing t of the third time distance measuring start point is determined, which time is longer than the time required for various calculations, the time for driving the lens and the time from the shutter releasing point to the exposure start point. The position of the subject at the timing when the time $T_3$ elapsed for the timing t is anticipated from the line L. And on the basis of the anticipated distance of the subject, the lens drive amount $\Delta$ is calculated.

After that, in step S36, the focus drive ring of the photographing lens is started to be driven.

After that, in step S37, it is discriminated whether the lens is driven by the amount $\Delta$ obtained in step S35 or not, that is, the lens drive motion is finished or not. If the discrimination result is NO, the flow moves back to step S36 wherein the lens is continued to be driven. On the other hand, if the discrimination result is YES, a series of sequence for distance measurement, calculation and lens drive is ended and the shutter is released to start the exposure in step S38.

That is, in accordance with the embodiment of the present invention mentioned above, the pixel data are taken out prior to the anticipating calculation of the subject motion in such a way that the first to third data are taken out in the first time operation, that a part of the second data is taken out in the second time operation, that the first to third data are taken out in the third time operation, and that the phase difference data is calculated in such a way that a first data is obtained from the data of two regions on the both sides of the optical axis obtained in the first time operation, that a second data is obtained from the data of region including the optical axis and the data of region not including the optical axis obtained in the second time operation, and that a third data is obtained from the data of region including the optical axis and the data of region not including the optical axis obtained in the third time operation. Therefore, it becomes possible to shorten the time for taking out the data and calculating the lens drive amount as well as anticipate the motion of the subject quickly and reliably.

As mentioned above, in accordance with the embodiments of the present invention, the electric charge accumulation (integration) for obtaining the data of the first to third arrays is conducted twice so that the lens drive amount is calculated on the basis of the data obtained in the two accumulating operations and that the lens is driven by the amount to focus on the subject. However, instead of such an arrangement, it may be arranged in such a way that first the defocus amount is obtained at the time of obtaining the first to third data for the first time operation so as to roughly position the lens at the in-focus position and that the second and third accumulating operations are conducted so that the lens is driven to move accurately to the in-focus position anticipating the motion of the subject on the basis of the data of first to third arrays. Such as arrangement has many common structure portions similar to those of FIGS. 13 to 18. The arrangement is described below focusing on the points differred from those of the above mentioned embodiments.

First, the first calculation means 41 calculates the first phase difference data $\sigma_1$ from the first array data $A_1$ and the second array data $B_1$ in step 51 of FIG. 14.

The second calculation means 42 calculates the second phase difference data $\sigma_2$ in step S79 of FIG. 17 on the basis of the data $A_2$ and $C_2$ registered in step S76. Also, the third calculation means 43 calculates the third phase difference data on the basis of the data $B_3$ and $C_3$.

The anticipating calculation means 44 calculates the lens drive amount $\Delta$ in step S81 of FIG. 17 considering the motion of the subject on the basis of five data, i.e., the second phase difference data $\sigma_2$, the third phase difference data $\sigma_3$, the time $T_1'$ obtained in step S56, the time $T_2'$, obtained in step S68, and the time $T_3'$ obtained in step S80.

In accordance with the above mentioned embodiment, the lens is first driven to approach the focusing point on the basis of the first time distance measurement result irrespective of whether the subject is moving or not and after that the lens is driven again anticipating the motion of the subject on the basis of the data of the second and third time distance measurement. As a result, it becomes possible to shorten the total time for focusing the lens and calculate to anticipate the position of the subject well following the motion of the subject.

As mentioned above, in accordance with the focus state detection device of the present invention, the pixel data is obtained in such a way that two fluxes in the symmetric regions with respect to the optical axis of the flux from the subject and the flux in the region including the optical axis are detected and that the phase difference data are calculated on the basis of the flux data so as to drive the lens. Therefore, it becomes possible to shorten the total time for autofocusing operation.

Such an advantage is especially useful in the case where the distance measurement is repeated for raising the accuracy of the in-focus state and for anticipating the motion of the subject.

Also, in accordance with the embodiment of the present invention, a part of the view field formed by the finder optical system is introduced to the distance measuring optical system. Therefore, even if the finder system and the distance measuring system are arranged independently from each other, parallax is not generated between the distance measuring portion in the finder view field and the actual distance measuring portion. Accordingly, the distance is measured fully satisfying the user's intention.

Further, in accordance with the embodiment of the present invention, the pixel data are detected in such a way that at least two data are selectively detected in the respective detection operations from three data of fluxes, i.e., the data of two fluxes in the symmetric regions with respect to the optical axis of the flux from the subject and the data of the flux in the region including the optical axis. And the phase difference data are calculated on the basis of these data to move the lens to the in-focus position. Therefore, the total time for driving the lens can be shortened.

Also, in accordance with the embodiment of the present invention, the pixel data are detected in such a way that the in-focus state is detected from the relation between the data of three fluxes, i.e., the data of two fluxes in the symmetric regions with respect to the optical axis of the flux from the subject and the data of the flux in the region including the optical axis. A monitor unit is disposed in the vicinity of the photoelectric converter elements which receive the optical flux in the region including the optical axis of the flux from the subject so that the optical integration function is controlled in such a way that the function for each of the three fluxes is stopped when the average output level from the monitor reaches a predetermined value. As a result, it becomes possible to obtain data which strictly follows the subject luminance irrespective of the distance to the subject or whether the subject is stationary of moving, which enables to raise the reliability of the data.

Also, even if the luminance of the subject is changed abruptly, the distance to the subject can be accurately measured. Besides, the reliability of the distance data is kept unchanged and high when the subject is moving, which makes it possible to further accurately detect the in-focus state.

Further, in accordance with the embodiment of the present invention, the pixel data are detected in such a way that at least two data are selectively detected in the respective detection operations from three data of fluxes, i.e., the data of two fluxes in the symmetric regions with respect to the optical axis of the flux from the subject and the data of the flux in the region including the optical axis and that a plurality of phase difference data at different timing points are obtained on the basis of the flux data so as to calculate to anticipate the subject motion and drive the lens in response to the anticipated motion. As a result, the total time for driving the lens can be shortened and the position of the subject can be accurately anticipated well following the motion thereof, which enables to photograph the moving subject without blurring.

Many widely different embodiments of the present invention may be constructed without departing from the spirit and scope of the present invention. It should be understood that the present invention is not limited to the specific embodiments described in the specification, except as defined in the appended claims.

What is claimed is:

1. A focus state detection device comprising:
a first optical conversional system for introducing an optical flux of a predetermined region in a view field frame to be photographed to one of two symmetric positions with respect to an optical axis of said optical flux;
a second optical conversional system for introducing an optical flux of said predetermined region to the other of said two symmetric positions;
a third optical conversional system for introducing an optical flux of said predetermined region to a position including said optical axis;
a first photoelectric converter means for generating an electric signal in response to optical intensity distribution of said optical flux introduced by said first conversional system;
a second photoelectric converter means for generating an electric signal in response to optical intensity distribution of said optical flux introduced by said second conversional system;
a third photoelectric converter means for generating an electric signal in response to optical intensity distribution of said optical flux introduced by said third conversional system; and
a calculation means for detecting a focus state of one subject to be photographed on the basis of correlation between the three electric signals output from said first, second and third converter means.

2. A focus state detection device comprising:
a first optical conversional system for introducing an optical flux of a predetermined region in a view field frame to be photographed to one of two symmetric positions with respect to an optical axis of said optical flux;
a second optical conversional system for introducing an optical flux of said predetermined region to the other of said two symmetric positions;
a third optical conversional system for introducing an optical flux of said predetermined region to a position including said optical axis;
a first photoelectric converter means for generating a first electric signal in response to optical intensity distribution of said optical flux introduced by said first conversional system;
a second photoelectric converter means for generating a second electric signal in response to optical intensity distribution of said optical flux introduced by said second conversional system;
a third photoelectric converter means for generating a third electric signal in response to optical intensity distribution of said optical flux introduced by said third conversional system;
an optical finder system for forming an observing view field frame corresponding to said view field frame and for introducing an optical flux of said region including an optical axis of said observing view field frame to said third conversional system; and
a calculation means for detecting a focus state of one subject to be photographed on the basis of correlation between said first, second and third electric signals output from said first, second and third converter means.

3. A focus state detection device comprising:
a first optical conversional system for introducing an optical flux of a predetermined region in a view field frame to be photographed to one of two symmetric positions with respect to an optical axis of said optical flux;
a second optical conversional system for introducing an optical flux of said predetermined region to the other of said two symmetric positions;
a third optical conversional system for introducing an optical flux of said predetermined region to a position including said optical axis;
a first light receiving portion comprising a plurality of electric charge accumulation type photoelectric converter elements disposed in a form of arrays to receive said optical flux introduced by said first conversional system;
a second light receiving portion comprising a plurality of electric charge accumulation type photoelectric converter elements disposed in a form of arrays to receive said optical flux introduced by said second conversional system;
a third light receiving portion comprising a plurality of electric charge accumulation type photoelectric converter elements disposed in a form of arrays to receive said optical flux introduced by said third conversional system;
a first electric charge clearing portion for clearing the electric charges accumulated in said first light receiving portion;
a second electric charge clearing portion for clearing the electric charges accumulated in said second light receiving portion;
a third electric charge clearing portion for clearing the electric charges accumulated in said third light receiving portion;
a shift register portion having a capacity corresponding to at least the number of said photoelectric converter elements of said first, second and third light receiving portions and transmitting a serial output in response to a shift signal;
a first electric charge data transmission portion for transmitting a data of an electric charge amount accumulated in said photoelectric converter elements of said first light receiving portion;
a second electric charge data transmission portion for transmitting a data of an electric charge amount accumulated in said photoelectric converter elements of said second light receiving portion;
a third electric charge data transmission portion for transmitting a data of an electric charge amount accumulated in said photoelectric converter elements of said second light receiving portion; and
a control portion arranged to emit simultaneously or selectively clearing signals output from said first, second and third clearing portions, transmission signals output from said first, second and third transmission portions, and a shift signal output from said shift register portion, for obtaining three or two signals of image information obtained in said first, second and third light receiving portions at a plurality of timings.

4. A focus state detection device comprising:
a first optical conversional system for introducing an optical flux of a predetermined region in a view field frame to be photographed to one of two symmetric positions with respect to an optical axis of said optical flux;

a second optical conversional system for introducing an optical flux of said predetermined region to the other of said two symmetric positions;

a third optical convensional system for introducing an optical flux of said predetermined region to a position including said optical axis;

a first photoelectric converter means for generating an electric signal corresponding to an optical intensity distribution data obtained by integrating said optical flux introduced by said first conversional system;

a second photoelectric converter means for generating an electric signal corresponding to an optical intensity distribution data obtained by integrating said optical flux introduced by said second conversional system;

a third photoelectric converter means for generating an electric signal corresponding to an optical intensity distribution data obtained by integrating said optical flux introduced by said third conversional system;

a photoelectric monitor means disposed in the vicinity of said third conversional means so as to monitor the optical amount of said optical flux introduced by said third conversional system;

a calculation means for calculating an in-focus state of one subject to be photographed on the basis of correlation between the three signals output from said first, second and third photoelectric converter means; and an integration control means for controlling said first, second and third photoelectric converter means in such a way that the optical integration function thereof is stopped when the output from said monitor means reaches a predetermined level.

5. A focus state detection device comprising:

a first optical conversional system for introducing an optical flux of a predetermined region in a view field frame to be photographed to one of two symmetric positions with respect to an optical axis of said optical flux;

a second optical conversional system for introducing an optical flux of said predetermined region to the other of said two symmetric positions;

a third optical conversional system for introducing an optical flux of said predetermined region to a position including said optical axis;

a first photoelectric converter means for generating a first electric signal in response to an optical intensity distribution of said optical flux introduced by said first conversional system;

a second photoelectric converter means for generating a second electric signal in response to an optical intensity distribution of said optical flux introduced by said second conversional system;

a third photoelectric converter means for generating a third electric signal in response to an optical intensity distribution of said optical flux introduced by said third conversional system;

a first calculation means for obtaining a first phase difference between said first and second electric signals;

a second calculation means for obtaining a second phase difference between said first and third electric signals;

a third calculation means for obtaining a third phase difference between said second and third electric signals;

a sequence control means for controlling said first, second and third converter means on the basis of a signal for starting a series of focus state detection sequence in such a way that said control means controls the timing for starting the photoelectric conversion by said first and second converter means so as to obtain said first and second electric signals, after that said control means controls the timing for starting the photoelectric conversion by said first and third converter means so as to obtain said first and third electric signals, and after that, said control means controls the timing for starting the photoelectric conversion by said second and third converter means so as to obtain said second and third electric signals; and a position anticipating calculation means for anticipating the position of one subject to be photographed, which is moving on the basis of said first, second and third phase difference data which are obtained from said first, second and third calculation means in time series by said sequence control means.

6. A focus state detection device according to any one of claims 1 to 5, wherein said device further comprises a mask which has a first hole, a second hole and a third hole constituting said first, second and third optical conversional systems, respectively, for forming said optical fluxes.

7. A focus state detection device according to claim 4, wherein each of said photoelectric converter means and said monitor means comprises a plurality of converter elements disposed side by side in a row, and wherein the converter elements of said monitor means are interdigitally arranged between the converter elements of said third converter means.

8. A focus state detection device comprising:

a photographing lens to form an image of a predetermined subject on a film equivalent plane;

a first optical flux introducing system for introducing a first optical flux having one of a pair of symmetric axes with respect to an optical axis of said photographing lens to re-form said subject image from said first optical flux;

a second optical flux introducing system for introducing a second optical flux having the other of said pair of symmetric axes to re-form said subject image from said second optical flux;

a third optical flux introducing system for introducing a third optical flux having an optical axis in extension from said axis of said photographing lens to re-form said subject image from said third optical flux;

a first photo-detector means for detecting said first optical flux;

a second photo-detector means for detecting said second optical flux;

a third photo-detector means for detecting said third optical flux; and a calculation means for calculating a focus state of said lens on the basis of outputs from said first, second and third photo-detector means.

* * * * *